(12) United States Patent (10) Patent No.: US 9,300,914 B2
Arai (45) Date of Patent: Mar. 29, 2016

(54) COMPUTER READABLE RECORDING MEDIUM AND TERMINAL APPARATUS

(71) Applicant: Brother Kogyo Kabushiki Kaisha, Nagoya-shi, Aichi-ken (JP)

(72) Inventor: Kentaro Arai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/664,982

(22) Filed: Mar. 23, 2015

(65) Prior Publication Data

US 2015/0281644 A1 Oct. 1, 2015

(30) Foreign Application Priority Data

Mar. 27, 2014 (JP) ................. 2014-067223

(51) Int. Cl.
*H04N 7/14* (2006.01)
*H04N 7/15* (2006.01)
*H04M 3/56* (2006.01)

(52) U.S. Cl.
CPC .............. *H04N 7/15* (2013.01); *H04M 3/567* (2013.01); *H04N 7/147* (2013.01)

(58) Field of Classification Search
CPC combination set(s) only.
See application file for complete search history.

(56) References Cited

U.S. PATENT DOCUMENTS

| 7,443,882 B2* | 10/2008 | Ohki | H04L 47/10 370/230 |
| 7,782,839 B2* | 8/2010 | Otsuka | H04L 29/06 370/352 |
| 8,050,710 B2 | 11/2011 | Koshijima et al. | |
| 2008/0242352 A1* | 10/2008 | Koshijima | H04M 1/72555 455/556.1 |
| 2012/0015692 A1 | 1/2012 | Koshijima et al. | |
| 2013/0057722 A1 | 3/2013 | Koshijima et al. | |

FOREIGN PATENT DOCUMENTS

| JP | 2008-245208 A | 10/2008 |
| JP | 2008-258779 A | 10/2008 |
| JP | 2010-114769 A | 5/2010 |
| JP | 2010-177848 A | 8/2010 |

* cited by examiner

*Primary Examiner* — Joseph J Nguyen
(74) *Attorney, Agent, or Firm* — Banner & Witcoff, Ltd.

(57) ABSTRACT

A terminal apparatus used for a remote conference with an counterpart apparatus through a network is configured to: detect an input of a movement instruction, the movement instruction being to move a position of a sub-display area in which a sub-display image is to be displayed on a main display image; register position information in a storage unit, the position information indicating an input position of input information; judge whether the position information registered in the storage unit corresponds to each of a plurality of candidate areas; and display a guide image corresponding to the candidate area, which does not correspond to the registered position information, and not displaying the guide image corresponding to the candidate area, which corresponds to the registered position information.

11 Claims, 15 Drawing Sheets

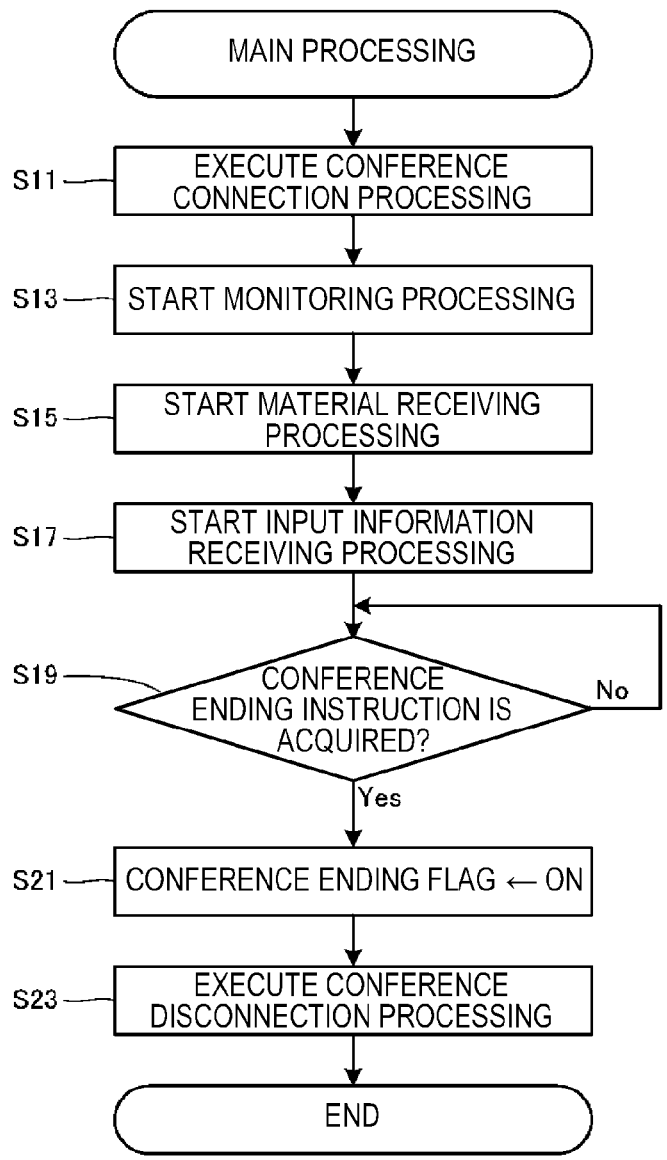

| POINTER ID | TERMINAL ID | MATERIAL ID | POSITION INFORMATION ||
|---|---|---|---|---|
| | | | X COORDINATE | Y COORDINATE |
| 1 | USER A | DOC1 | 50 | 60 |
| 2 | USER B | DOC2 | 80 | 70 |
| 3 | USER C | DOC2 | 1180 | 940 |

| ANNOTA-TION ID | TERMINAL ID | MATERIAL ID | POSITION INFORMATION ||||  | IMAGE DATA |
|---|---|---|---|---|---|---|---|
| | | | X COORDINATE || Y COORDINATE || |
| | | | LEFT | RIGHT | UPPER | LOWER | |
| 1 | USER B | DOC1 | 10 | 50 | 20 | 60 | IMAGE 1 |
| 2 | USER C | DOC2 | 200 | 300 | 300 | 450 | IMAGE 2 |
| 3 | USER D | DOC2 | 1100 | 1200 | 900 | 930 | IMAGE 3 |

| CANDIDATE AREA ID | POSITION INFORMATION | | | | PRIORITY |
|---|---|---|---|---|---|
| | X COORDINATE | | Y COORDINATE | | |
| | LEFT | RIGHT | UPPER | LOWER | |
| 651 | 0 | 320 | 0 | 240 | 0 |
| 652 | 0 | 320 | 720 | 960 | 1 |
| 653 | 960 | 1280 | 0 | 240 | 1 |
| 654 | 960 | 1280 | 720 | 960 | 1 |

*FIG. 20*

| CANDIDATE AREA ID | POSITION INFORMATION | | | | PRIORITY |
|---|---|---|---|---|---|
| | X COORDINATE | | Y COORDINATE | | |
| | LEFT | RIGHT | UPPER | LOWER | |
| 651 | 0 | 320 | 0 | 240 | 0 |
| 652 | 0 | 320 | 720 | 960 | 1 |
| 653 | 960 | 1280 | 0 | 240 | 1 |
| 654 | 960 | 1280 | 720 | 960 | 0.5 |

COMPUTER READABLE RECORDING MEDIUM AND TERMINAL APPARATUS

CROSS REFERENCE TO RELATED APPLICATION

This application is based upon and claims the benefit of priority of Japanese Patent Application No. 2014-067223 filed on Mar. 27, 2014, the contents of which are incorporated herein by reference in its entirety.

BACKGROUND

The present disclosure relates to a computer readable recording medium storing a program that can be executed by a computer configured to control a terminal apparatus used for a remote conference through a network, and a terminal apparatus.

A technology for a remote conference through a network has been known. For example, a video conference apparatus is known. The video conference apparatus is configured to transmit and receive an image and the like to and from other video conference apparatuses, performing a video conference. In the video conference apparatus, PinP (picture in picture) image generation processing of generating a PinP image, in which a transmission image is made to overlap with a PinP area in a reception image, is executed. In this processing, a face area is detected, as an important area, from the reception image, and one candidate area of four candidate areas in the reception image, in which the face area is not imaged as much as possible, is determined as the PinP area. Subsequently, a PinP image in which a transmission image is made to overlap with the determined PinP area in the reception image is displayed. In a related art, the PinP can be determined by setting a movement area, which is an area in the reception image in which there is movement, and an edge area, which is an area in the reception image in which there is an edge, as important areas, in addition to the face area in the reception image.

SUMMARY

An aspect of the present disclosure provides the following arrangements:

A non-transitory computer readable recording medium storing a program which is executable by a computer configured to control a terminal apparatus used for a remote conference with a counterpart apparatus through a network, the program causing the computer to execute:

a detection instruction of detecting an input of a movement instruction through an operation unit of the terminal apparatus, the movement instruction being to move a position of a sub-display area in which a sub-display image is to be displayed on a main display image in a remote conference screen, wherein the sub-display image overlaps with a part of the main display image in the remote conference screen;

a registration instruction of registering position information in a storage unit, the position information being acquired through a communication unit connected to the network, the position information indicating an input position of input information with respect to a predetermined position of a counterpart main display image on a counterpart remote conference screen which is displayed on the counterpart apparatus;

a first judgment instruction of judging whether the position information registered in the storage unit corresponds to position information of each of a plurality of candidate areas, the plurality of candidate areas being movement destination candidates of the sub-display area;

a determination instruction of determining a priority of the candidate area of the position information not corresponding to the position information registered in the storage unit to a first value, and determining a priority of the candidate area of the position information corresponding to the position information registered in the storage unit to a second value, the second value being different from the first value, and a first display control instruction of displaying a guide image corresponding to the candidate area with a priority of the first value, in correspondence to the detected input of the movement instruction, without displaying a guide image corresponding to the candidate area with a priority of the second value.

A non-transitory computer readable recording medium storing a program which is executable by a computer configured to control a terminal apparatus used for a remote conference with a counterpart apparatus through a network, the program causing the computer to execute:

a detection instruction of detecting an input of a movement instruction through an operation unit of the terminal apparatus, the movement instruction being to move a position of a sub-display area in which a sub-display image is to be displayed on a main display image in a remote conference screen, wherein the sub-display image overlaps with a part of the main display image in the remote conference screen;

a registration instruction of registering position information in a storage unit, the position information being acquired through a communication unit connected to the network, the position information indicating an input position of input information with respect to a predetermined position of a counterpart main display image on a counterpart remote conference screen which is displayed on the counterpart apparatus;

a first judgment instruction of making a judgment whether the position information registered in the storage unit corresponds to position information of each of a plurality of candidate areas, the plurality of candidate areas being movement destination candidates of the sub-display area; and a first display control instruction of displaying a guide image corresponding to the candidate area, which does not correspond to the position information registered in the storage unit, in correspondence to the detected input of the movement instruction, without displaying the guide image corresponding to the candidate area, which corresponds to the position information registered in the storage unit, in correspondence to the detected input of the movement instruction.

A terminal apparatus used for a remote conference with an counterpart apparatus through a network, the terminal apparatus comprising:

a processor; and memory storing computer executable instructions, when executed by the processor, causing the terminal apparatus to execute:

a detection instruction of detecting an input of a movement instruction through an operation unit of the terminal apparatus, the movement instruction being to move a position of a sub-display area in which a sub-display image is to be displayed on a main display image in a remote conference screen, wherein the sub-display image overlaps with a part of the main display image in the remote conference screen;

a registration instruction of registering position information in a storage unit, the position information being acquired through a communication unit connected to the network, the position information indicating an input position of input information with respect to a predetermined position of a counterpart main display image on a counterpart remote conference screen which is displayed on the counterpart apparatus;

a first judgment instruction of making a judgment whether the position information registered in the storage unit corresponds to position information of each of a plurality of candidate areas, the plurality of candidate areas being movement destination candidates of the sub-display area;

a determination instruction of determining a priority of the candidate area of the position information not corresponding to the position information registered in the storage unit to a first value, and determining a priority of the candidate area of the position information corresponding to the position information registered in the storage unit to a second value, the second value being different from the first value, and a first display control instruction of displaying a guide image corresponding to the candidate area with a priority of the first value, in correspondence to the detected input of the movement instruction, without displaying a guide image corresponding to the candidate area with a priority of the second value.

BRIEF DESCRIPTION OF DRAWINGS

FIG. 3 is a flowchart of main processing.

FIG. 4 shows an example of a user table.

FIG. 20 shows an example of a movement candidate table of the second embodiment.

DESCRIPTION OF ILLUSTRATIVE EMBODIMENTS

Figure 1:
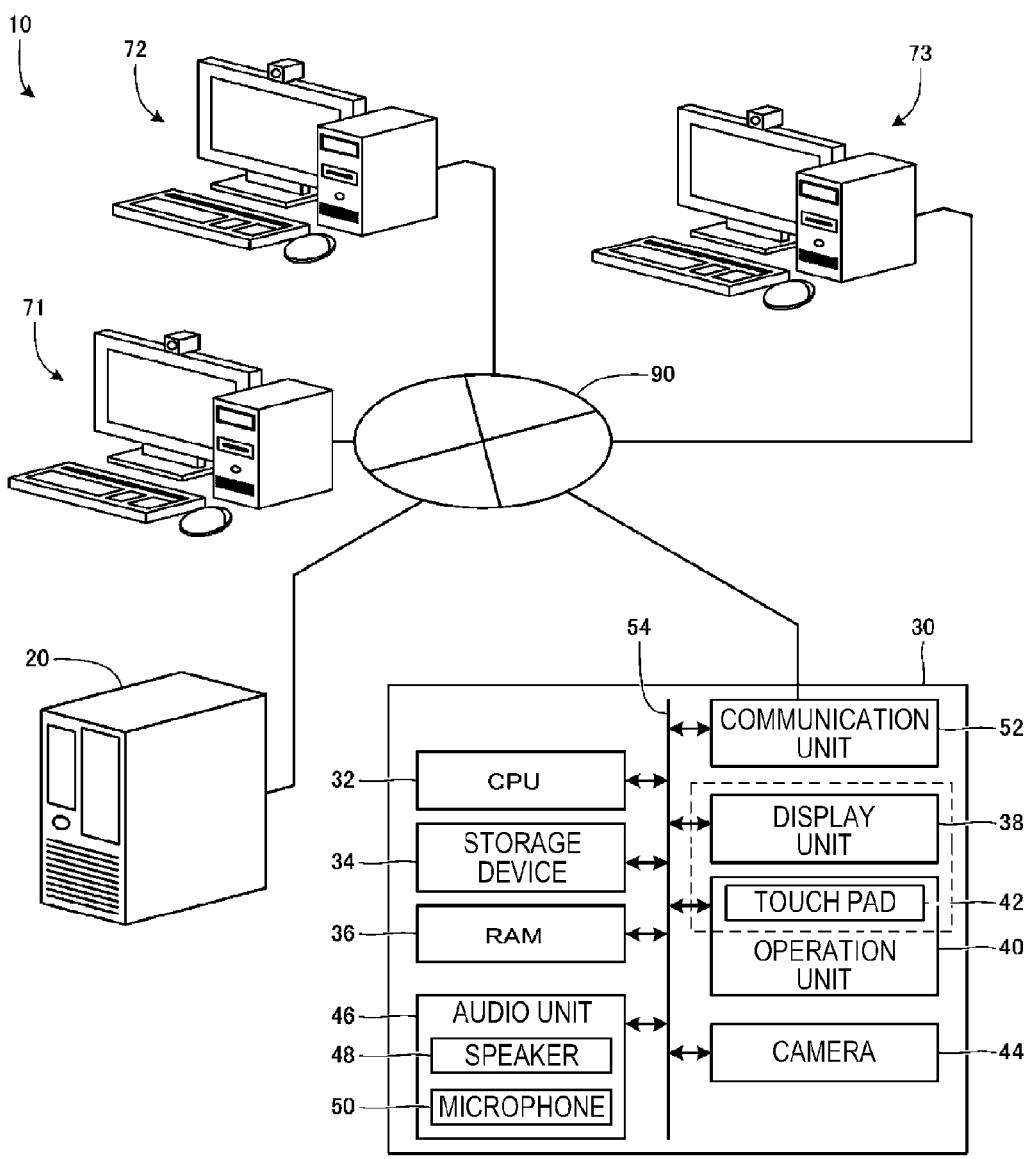
FIG. 1 illustrates an example of a remote conference system.

In a terminal apparatus used for a remote conference, a remote conference screen is displayed during the remote conference. In some cases, the remote conference screen may be configured so that a sub-display screen is arranged to overlap with a part of a main display image becoming a background. In the remote conference screen, the main display image becoming a background is not limited to a captured image captured at the other terminal apparatus of the remote conference. That is, a variety of images including a still image and a moving image may be the main display image. For example, when a material (sharing material) shared by the respective terminal apparatuses taking part in the remote conference is necessarily required, the material may be the main display image. The important area to a user of the terminal apparatus, which is a participant of the remote conference, is changed depending on a type of the main display image or a situation or progressing of the remote conference. When the sharing material is the main display image, a case where a text is included on the entire screen or there is no movement is also considered. Therefore, if an arrangement of a sub-display area, in which the sub-display image overlapping with the main display image is displayed, is determined on the basis of only the main display image, an area that is considered to have low importance may be important at predetermined time of the remote conference.

The inventors investigated a configuration where a position of the sub-display area, in which the sub-display image is displayed, is moveable on the remote conference screen on which the sub-display image is arranged to overlap with a part of the main display image. Regarding this, the inventors conceived a configuration where a user manually selects a specific sub-display area from a plurality of movement destination candidates. When a new sub-display area is manually selected, if a guide image indicating a range of the sub-display area after movement relative to the main display image is displayed, the user can confirm a display state after the movement. For this reason, the inventors thought that it is possible to improve a user's convenience by the configuration enabling the display state after the movement to be confirmed. However, if the guide image is displayed up to a movement destination candidate overlapping with an important area depending on the situation of the remote conference, following problems may occur. That is, the important information may be visibly interrupted when the guide image is displayed. In addition, the user may erroneously move the sub-display area to an area, in which the important information is displayed, so that the sub-display image may be displayed. Further, the smooth progress of the remote conference may not be made due to the corresponding operations.

It is therefore an object of the present disclosure to provide a terminal apparatus program and a terminal apparatus enabling a remote conference to be smoothly progressed by smoothly moving a sub-display area, in which a sub-display image is displayed on a remote conference screen in which the sub-display image is displayed to overlap with a main display image.

Hereinafter, illustrative embodiments of the present disclosure will be described with reference to the drawings. The present invention is not limited to the below illustrative embodiments and can adopt a variety of configurations within the range of the same technical spirit. For example, a part of the configurations described later may be omitted or replaced with other configurations. The other configurations may also be included.

An outline of a remote conference system 10 is described with reference to FIGS. 1 and 2. As shown in FIG. 1, the remote conference system 10 includes a server apparatus 20, and communication apparatuses that are operated by a plurality of users participating in a conference. In the below, a terminal apparatus 30 and three counterpart apparatuses 71, 72, 73 are exemplified as the communication apparatuses and the descriptions are made on the basis of a remote conference that is performed by the four communication apparatuses. That is, it is assumed that the terminal apparatus 30 and the counterpart apparatuses 71, 72, 73 participate in the same remote conference identified by a predetermined conference ID. The remote conference by the remote conference system 10 may also be performed by two or three communication apparatuses or five or more communication apparatuses.

The conference ID is information for identifying a remote conference that is performed by the terminal apparatus 30 and the counterpart apparatuses 71, 72, 73. In the remote conference identified by the conference ID, the terminal apparatus 30 and the counterpart apparatuses 71, 72, 73 are identified by terminal IDs. In the illustrative embodiment, the respective terminal IDs of the terminal apparatus 30 and the counterpart apparatuses 71, 72, 73 are set as follows. The terminal ID of the terminal apparatus 30 is set to 'USER D'. The terminal ID of the counterpart apparatus 71 is set to 'USER A'. The terminal ID of the counterpart apparatus 72 is set to 'USER B'. The terminal ID of the counterpart apparatus 73 is set to 'USER C'.

In the remote conference identified by the conference ID, predetermined authorities are set for each of the terminal apparatus 30 and the counterpart apparatuses 71, 72, 73. As the authorities set in the remote conference, a chairman (or a host), a presenter and a participant may be exemplified. Regarding the three authorities, the chairman is an authority of the highest rank, the presenter is an authority of a middle rank, and the participant is an authority of the lowest rank. The chairman can execute all functions that can be used in the remote conference system 10. The presenter is restricted to execute a part of the functions that can be used in the remote conference system 10. The participant is restricted to execute more functions, as compared to the presenter. In the illustrative embodiment, the authorities set in the remote conference are the chairman, the presenter and the participant.

The server apparatus 20, the terminal apparatus 30 and the counterpart apparatuses 71, 72, 73 are connected to a network 90. The network 90 is a network such as the Internet. In the remote conference system 10, the remote conference by the terminal apparatus 30 and the counterpart apparatuses 71, 72, 73 is performed via the server apparatus 20.

The terminal apparatus 30 is a communication apparatus having a communication function through the network 90. The terminal apparatus 30 is a communication apparatus such as a smart phone, a tablet terminal or a PC, for example. A configuration of the terminal apparatus 30 will be described later. The counterpart apparatuses 71, 72, 73 are well-known communication apparatuses. The term 'counterpart apparatus' is an expediential term for identification with the terminal apparatus 30, in the illustrative embodiment where the terminal apparatus 30 is mainly described. The descriptions of the counterpart apparatuses 71, 72, 73 are appropriately omitted.

The server apparatus 20 is configured to execute the remote conference by the terminal apparatus 30 and the counterpart apparatuses 71, 72, 73. In the remote conference that is performed in the remote conference system 10, captured data captured by respective cameras of the terminal apparatus 30 and counterpart apparatuses 71, 72, 73 is transmitted to the server apparatus 20. Also, in the remote conference, sound data collected by respective microphones of the terminal apparatus 30 and counterpart apparatuses 71, 72, 73 is transmitted to the server apparatus 20. The terminal apparatus 30 and the counterpart apparatuses 71, 72, 73 are respectively configured to transmit a conference ID and an own apparatus terminal ID, for example, together with the captured data or sound data to the server apparatus 20.

The server apparatus 20 is configured to receive the captured data or sound data, the conference ID and the terminal IDs, which are transmitted from each of the terminal apparatus 30 and counterpart apparatuses 71, 72, 73. In a storage unit of the server apparatus 20, the conference ID, the terminal ID of the terminal apparatus 30 participating in the remote conference identified by the conference ID, and the authority information indicating the authorities corresponding to the respective terminal IDs are associated and stored. The server apparatus 20 is configured to specify the communication apparatuses to take part in the remote conference identified by the conference ID, based on the conference ID. The server apparatus 20 is configured to specify a communication apparatus other than the transmission source apparatuses of the respective received data, from the specified communication apparatuses, based on the terminal IDs. The server apparatus 20 is configured to transmit the respective received data and information to the communication apparatus other than the specified transmission source apparatuses.

The captured data is moving image data of a predetermined compression format. As the compression format, H.264 may be exemplified. The sound data is data compressed by a predetermined compression format such as MPEG-4 AAC, G.411 and the like. The transmission of the captured data and sound data between the terminal apparatus 30 and the counterpart apparatuses 71, 72, 73 via the server apparatus 20 is performed by a streaming method. The conference ID and the terminal ID may be included in each header part of the captured data and the sound data, for example. The server apparatus 20 may be configured to transmit the captured data to the transmission source apparatus, too. However, in the illustrative embodiment, the captured data is not transmitted to the transmission source apparatus.

For example, it is assumed that the server apparatus 20 receives the captured data, the conference ID and the terminal ID 'USER B' from the counterpart apparatus 72. In this case, the server apparatus 20 specifies the terminal apparatus 30 and the counterpart apparatuses 71, 73, based on the conference ID and the terminal ID 'USER B'. The server apparatus 20 transmits the captured data, conference ID and terminal ID 'USER B' received from the counterpart apparatus 72 to the specified terminal apparatus 30 and counterpart apparatuses 71, 73, respectively. On the terminal apparatus 30 and counterpart apparatuses 71, 73 having received the captured data from the counterpart apparatus 72, a captured image 63 obtained by decoding the captured data received from the counterpart apparatus 72 is displayed (refer to FIG. 2). The terminal apparatus 30 and the counterpart apparatuses 71, 72, 73 may also be configured to display captured images captured at own apparatuses.

Describing 'own apparatus' of the illustrative embodiment, when a subject is the terminal apparatus 30, for example, the own apparatus is the terminal apparatus 30. In the illustrative embodiment, a communication apparatus other than own apparatus is referred to as 'other apparatus'. Based on the above example where the own apparatus is the terminal apparatus 30, the other apparatus is a part or all of the counterpart apparatuses 71, 72, 73.

In the remote conference system 10, a predetermined material is shared among the terminal apparatus 30 and the counterpart apparatuses 71, 72, 73 in the remote conference identified by the conference ID. In the remote conference identified by the conference ID, a plurality of materials may also be shared. In the illustrative embodiment, a material shared among all of the terminal apparatus 30 and the counterpart apparatuses 71, 72, 73 is referred to as 'sharing material 61'. The sharing material 61 is a material corresponding to sharing material data. The sharing material data may be a data file with a predetermined format. Alternatively, sharing material data may be a still image or video stream that are generated by capturing a screen of the sharing material displayed in one of the terminal apparatus 30 and the counterpart apparatuses 71, 72, 73. On the terminal apparatus 30 and the counterpart apparatuses 71, 72, 73, the sharing material 61 is displayed in accordance with the sharing material data (refer to FIG. 2). A user who operates each of the terminal apparatus 30 and the counterpart apparatuses 71, 72, 73 participates in the remote conference while using the sharing material 61 displayed on the own apparatus.

The sharing material data is transmitted to the server apparatus 20 from a predetermined communication apparatus of the terminal apparatus 30 and the counterpart apparatuses 71, 72, 73 at predetermined timing during the remote conference. The conference ID and the transmission source apparatus terminal ID are also transmitted together with the sharing material data. The server apparatus 20 receives the sharing material and transmits the sharing material data to all of the terminal apparatus 30 and counterpart apparatuses 71, 72, 73 participating in the remote conference identified by the conference ID. At this time, the server apparatus 20 gives a material ID to the sharing material data and transmits the material ID together with the sharing material data. The material ID is an ID for identifying each sharing material data. The material ID may be included in a header part of data packet including the sharing material data. The server apparatus 20 may be configured not to transmit the sharing material data to the transmission source apparatus of the sharing material data.

In a predetermined communication apparatus of the terminal apparatus 30 and counterpart apparatuses 71, 72, 73, an input position of a pointer 65, which is displayed together with the sharing material 61, is calculated and pointer data is generated. As the input position of the pointer 65, a position of the pointer 65, which is displayed in accordance with an operation of a mouse, may be exemplified. The pointer 65, which is displayed in accordance with an operation of a mouse, may also be referred to as a cursor. In addition, as the input position of the pointer 65, a position tapped on a touch pad 42 may be exemplified. A display position of the pointer 65 is moved, in response to operation information input through an operation of the mouse or touch pad 42. The pointer data is data in which the terminal ID, the material ID and the position information indicating an input position of the pointer 65 are associated. The terminal ID is of own apparatus. The material ID relates to the sharing material data corresponding to the sharing material 61 being displayed. In the illustrative embodiment, the position information indicating the input position of the pointer 65 includes one X coordinate value and one Y coordinate value.

From the terminal apparatus 30 and counterpart apparatuses 71, 72, 73, the generated pointer data is transmitted to the server apparatus 20. The server apparatus 20 receives the pointer data and transmits the pointer data to the communication apparatuses other than the transmission source apparatus of the pointer data. On the terminal apparatus 30 and counterpart apparatuses 71, 72, 73 having received the pointer data transmitted from the server apparatus 20, the pointer 65 is displayed to overlap with the sharing material 61 being displayed, in accordance with the pointer data. At this time, when the sharing material 61 being displayed on the own apparatus is not a material corresponding to the material ID included in the pointer data, the pointer 65 is not displayed. In FIG. 2, the pointer 65 is representatively displayed, in accordance with the pointer data from the counterpart apparatus 72 of which a terminal ID is 'USER B' and a user name is 'Hanako', and the illustration of the pointer 65 on the communication apparatuses other than the counterpart apparatus 72 is omitted.

In the terminal apparatus 30 and the counterpart apparatuses 71, 72, 73, an annotation 66 can be input to the sharing material 61 displayed on the own apparatus. The annotation 66 is information that is displayed to overlap with the sharing material 61. Each user of the terminal apparatus 30 and counterpart apparatuses 71, 72, 73 manually inputs the annotation 66 by an annotation input operation. The annotation input operation is an operation of describing a line drawing and the like by sliding a finger or touch pen on the touch pad 42 or by operating the mouse. On the terminal apparatus 30 and the counterpart apparatuses 71, 72, 73, the input annotation 66 is displayed to overlap with the sharing material 61 being displayed (refer to FIG. 2).

When the annotation 66 is input to the sharing material 61 by the annotation input operation, an input position of the annotation 66 input to the sharing material 61 is calculated and annotation data is generated in the terminal apparatus 30 and the counterpart apparatuses 71, 72, 73. The annotation data is data in which the terminal ID, the material ID, the image data corresponding to the drawn annotation 66 and position information indicating the input position of the annotation 66 are associated. The terminal ID is of own apparatus. The material ID is a material ID relating to the sharing material data corresponding to the sharing material 61 to which the annotation 66 is input. In the illustrative embodiment, the input position of the annotation 66 is specified as a rectangular area. Therefore, the position information indicating the input position of the annotation 66 includes respective values of an X coordinate 'left' and a Y coordinate 'upper' corresponding to a left-upper corner of the rectangular area and respective values of an X coordinate 'right' and a Y coordinate 'lower' corresponding to a right-lower corner of the rectangular area. In the illustrative embodiment, the upper and lower and the left and right are as shown in FIG. 2.

From the terminal apparatus 30 and the counterpart apparatuses 71, 72, 73, the generated annotation data is transmitted to the server apparatus 20. The server apparatus 20 receives the annotation data and transmits the annotation data to the communication apparatuses other than the transmission source apparatus of the annotation data. On the terminal apparatus 30 and counterpart apparatuses 71, 72, 73 having received the annotation data transmitted from the server apparatus 20, the annotation 66 corresponding to the annotation data is displayed to overlap with the sharing material 61 being displayed (refer to FIG. 2). At this time, when the sharing material 61 being displayed on the own apparatus is not a material corresponding to the material ID included in the annotation data, the annotation 66 is not displayed.

In the remote conference identified by the conference ID, a remote conference screen 60 is displayed on the terminal apparatus 30 and the counterpart apparatuses 71, 72, 73. As shown in FIG. 2, the remote conference screen 60 includes a main display area 62 and a sub-display area 64. The main display area 62 is an area in which a main display image is displayed. As the main display image, the sharing material 61 corresponding to the sharing material data may be exemplified. The sub-display area 64 is an area in which a sub-display image is displayed. As the sub-display image, the captured image corresponding to the captured data may be exemplified. In the illustrative embodiment, candidate areas 651, 652, 653, 654 are set in correspondence to four corner parts of the main display area 62. The candidate areas 651, 652, 653, 654 are areas becoming a movement destination candidate of the sub-display area 64. In the remote conference screen 60 shown in FIG. 2, the sub-display area 64 is set in the candidate area 653 of the four candidate areas 651, 652, 653, 654. The sub-display image displayed in the sub-display area 64 is arranged to overlap with a part of the main display image displayed in the main display area 62. In the illustrative embodiment, the main display image is the sharing material 61 corresponding to the sharing material data. The sub-display image is the captured image corresponding to the captured data from the other apparatus. In the illustrative embodiment, the main display area 62, the sub-display area 64, and the candidate areas 651, 652, 653, 654 are all specified as the rectangular areas.

In the terminal apparatus 30, it is possible to set a display or a non-display for each captured image of the own apparatus and the other apparatuses. A captured image for which the display is set is displayed in the sub-display area 64. A captured image for which the non-display is set is not displayed even though the corresponding captured data is received. On the remote conference screen 60, it is possible to move a display position of a captured image being displayed to any one of the candidate areas 651, 652, 653, 654. At this time, guide images 641, 642, 643, 643 corresponding to the candidate areas 651, 652, 653, 654 becoming a movement destination candidate of the sub-display area 64 are appropriately displayed. In the illustrative embodiment, it is assumed in the terminal apparatus 30 that the captured image 63 of the counterpart apparatus 72 is set to be displayed and the respective captured images of the own apparatus and the counterpart apparatuses 71, 73 are set not to be displayed. The remote conference screen 60 shown in FIG. 2 corresponds to a remote conference screen that is displayed on the terminal apparatus 30 set in this way. In FIG. 2, the guide image 643 corresponding to the candidate area 653 is displayed to overlap with the captured image 63. The remote conference screen 60 is a screen having a layer structure. The respective images on the remote conference screen 60 are arranged with being distributed to each predetermined layer and are displayed with being overlapped.

Regarding the captured image for which the non-display is set, the server apparatus 20 may not transmit the captured data corresponding to the captured image for which the non-display is set to the communication apparatus having set the non-display. In this case, for example, the terminal ID of the communication apparatus of the captured image for which the non-display is set is transmitted from the communication apparatus having set the non-display to the server apparatus 20 with being associated with the terminal ID of the communication apparatus having set the non-display. The server apparatus 20 is configured to associate and store the terminal ID of the communication apparatus having set the non-display and the terminal ID of the communication apparatus of the captured image for which the non-display is set. According to the above example, the terminal apparatus 30 associates the own apparatus terminal ID 'USER D' and the terminal IDs 'USER A' and 'USER C' of the counterpart apparatuses 71, 73 for which the non-display is set, and transmits the same to the server apparatus 20. The server apparatus 20 associates and stores the terminal ID 'USER D' and the terminal IDs 'USER A' and 'USER C'. In accordance with the association, the server apparatus 20 transmits the captured data received from the counterpart apparatus 72 to the terminal apparatus 30 and does not transmit the captured data received from the counterpart apparatuses 71, 73. Contrary to the above configuration, the terminal identification information of the communication apparatus for which the display is set may be transmitted to the server apparatus 20 and the captured data from the communication apparatus for which the display is set may be transmitted from the server apparatus 20. Also in this case, it is possible to transmit the captured data, like the above example.

The server apparatus 20 is the same communication apparatus as the server apparatus in the well-known remote conference system. Therefore, the descriptions about the configuration of the server apparatus 20 are omitted. Regarding the 'transmission source apparatus' of the illustrative embodiment, when an apparatus configured to acquire predetermined data is a subject, the 'transmission source apparatus' of the predetermined data may also be referred to as a communication apparatus of a provision source of the predetermined data.

<Terminal Apparatus>

As shown in FIG. 1, the terminal apparatus 30 has a CPU 32, a storage device 34, a RAM 36, a display unit 38, an operation unit 40, a camera 44, an audio unit 46 and a communication unit 52. The respective units 32 to 52 are connected to a bus 54.

The CPU 32 is configured to execute calculation processing. The storage device 34 is configured by a computer-readable storage medium. For example, the storage device 34 is configured by a hard disk drive and/or a flash memory. In addition, the storage device 34 may include a ROM, for example. In the storage device 34, a variety of programs are stored. For example, an OS (Operating System) and a variety of applications are stored in the storage device 34. The applications stored in the storage device 34 include a program for executing respective processing (refer to FIG. 3, FIG. 5, FIG. 6, FIG. 8, FIG. 9, FIG. 12 and FIGS. 14 to 19), which will be described later. The program for executing the respective processing may be installed in advance in the storage device 34. However, when the terminal apparatus 30 accesses the server apparatus 20 upon participation in the remote conference, the program may be transmitted from the server apparatus 20 to the terminal apparatus 30 via the network 90, as a transmission signal, and then installed in the storage device 34 at that timing. In this case, the program is allowed to be stored in the RAM 36.

The program stored in a storage medium, which a computer such as a semiconductor memory can read, for example, is read by a reading unit (not shown) of the terminal apparatus 30, so that the pre-installing is performed. When the terminal apparatus 30 has an optical drive (not shown), for example, a program stored in an optical medium is read by the optical drive, so that the pre-installing may be performed. In addition, a program stored in a storage medium, which a computer such as a hard disk drive of a server apparatus (the server apparatus 20 or a server apparatus (not shown)) connected to the terminal apparatus 30 through the network 90 can read, is received through the communication unit 52 of the terminal apparatus 30, as a transmission signal, so that the pre-installing may be performed. The pre-installing is appropriately determined, considering diverse situations. In the meantime, the computer-readable storage medium may not include a signal that is transitorily transmitted. The computer-readable storage medium may be a non-transitory storage medium not including a transitorily medium such as temporary signal. The non-transitory storage medium may be a storage medium capable of storing therein information, irrespective of a time period for which the information is stored.

The RAM 36 is a storage area that is used when the CPU 32 executes the various programs. In the RAM 36, predetermined data and information, which are used in the processing, are stored in a predetermined storage area during the execution of the processing. In the terminal apparatus 30, the CPU 32 executes the OS and the programs of the respective processing shown in FIG. 3, FIG. 5, FIG. 6, FIG. 8, FIG. 9, FIG. 12 and FIGS. 14 to 19, which are stored in the storage device 34, thereby controlling the terminal apparatus 30. Thereby, the various processing is executed and various functional means is implemented in the terminal apparatus 30.

The display unit 38 is a liquid crystal monitor, for example. The display unit 38 is configured to display a variety of information. For example, the remote conference screen 60 (refer to FIG. 2) is displayed on the display unit 38. The operation unit 40 is configured to receive inputs such as various commands to the terminal apparatus 30. The operation unit 40 includes the touch pad 42, for example. The touch pad 42 is a position input device of an electrostatic capacity type, for example, and is configured to output a signal indicating a coordinate position corresponding to a touch position of a user's finger. The touch pad 42 may also be configured by the other position input device such as a resistance film type and an ultrasonic type. By the display unit 38 and the touch pad 42, a touch panel (refer to a dotted line surrounding the 'display unit 38' and the touch pad 42' in FIG. 1) is implemented.

A user of the terminal apparatus 30 performs a predetermined operation on the touch pad 42. The predetermined operation may include a scroll, a swipe, a flick, a tap, a drag, a pinch in and a pinch out, for example. The user of the terminal apparatus 30 performs the above various operations by pressing a finger on the touch pad 42 and moving the finger touching the touch pad 42 in a predetermined direction. The processing of generating operation information (for example, an operation type, a moving distance and the like) corresponding to the respective operations on the basis of the signals output from the touch pad 42 resulting from the operations is a technology adopted in the well-known smart phone or tablet terminal and is adopted in the terminal apparatus 30, too. In addition, the operation unit 40 includes a keyboard and a mouse. Although the details are omitted, the processing of generating operation information corresponding to respective operations for the keyboard and mouse is also a technology adopted in the well-known PC and is adopted in the terminal apparatus 30, too.

The camera 44 is configured to capture an image of the outside world in front of the terminal apparatus 30. For example, when the user of the terminal apparatus 30 is in front of the terminal apparatus 30, the camera 44 captures an image of the outside world including the user. The audio unit 46 includes a speaker 48 and a microphone 50. The speaker 48 is configured to output sound. The microphone 50 is configured to collect outside sound. For example, the microphone 50 is configured to collect a voice uttered by the user. The audio unit 46 is configured to output sound corresponding to the sound data from the speaker 48. The audio unit 46 is configured to generate waveform data obtained by A/D converting the sound collected by the microphone 50 with a predetermined sampling frequency (for example, 11.025 kHz or 44.1 kHz). In the terminal apparatus 30, when the remote conference begins, the capturing of the camera 44 and the sound collection of the microphone 50 start and the captured data corresponding to the captured image captured by the camera 44 and the sound data corresponding to the sound (the waveform data A/D converted with the predetermined sampling frequency) collected by the microphone 50 are generated.

The communication unit 52 connects the terminal apparatus 30 to the network 90 and is configured to perform data communication through the network 90. For example, in the terminal apparatus 30, the various data and information are transmitted and received to and from the server apparatus 20 through the communication unit 52. The communication unit 52 is an interface circuit suitable for the Ethernet (registered trademark) standards, for example. The connection to the network 90 by the communication unit 52 may be wireless connection or wired connection.

The terminal apparatus 30 is different from the well-known communication apparatus, in that the programs of the respective processing (refer to FIG. 3, FIG. 5, FIG. 6, FIG. 8, FIG. 9, FIG. 12 and FIGS. 14 to 19) are stored in the storage device 34. However, the terminal apparatus 30 is the same communication apparatus as the well-known communication apparatus, in hardware aspects. The counterpart apparatuses 71, 72, 73 are the communication apparatuses capable of implementing the same functions as the terminal apparatus 30. That is, the counterpart apparatuses 71, 72, 73 are the same communication apparatuses as the terminal apparatus 30. Therefore, the descriptions about the configurations of the counterpart apparatuses 71, 72, 73 are omitted.

<Main Processing>

Main processing that is executed in the terminal apparatus 30 is described with reference to FIG. 3. In the meantime, as described above, the main processing and respective processing (refer to FIG. 5, FIG. 6, FIG. 8, FIG. 9, FIG. 12 and FIGS. 14 to 19) are executed in each of the counterpart apparatuses 71, 72, 73 in the same manner as the terminal apparatus 30. In the remote conference system 10, an email is transmitted from the server apparatus 20 to respective email addresses corresponding to each of the terminal apparatus 30 and the counterpart apparatuses 71, 72, 73, which will participate in a remote conference, before a scheduled commencement date of the remote conference. The email includes a URL (Uniform Resource Locator) for a remote conference by the terminal apparatus 30 and counterpart apparatuses 71, 72, 73. The URL is inherent to a conference room of the remote conference. In other words, the URL includes a conference ID and a password for the remote conference. The conference ID and the password may be included as query parameters of the URL, for example. In the meantime, the predetermined authority information and the password are associated and stored in the storage unit of the server apparatus 20. For this reason, upon the participation in the remote conference identified by the conference ID, the authority information is determined by the password included in the query parameters of the URL. That is, it can also be understood that the URL includes the authority information.

The user of the terminal apparatus 30 operates the terminal apparatus 30 at a scheduled commencement date of the remote conference. In response to the operation, the CPU 32 starts main processing. The CPU 32 having started the main processing executes conference connection processing (S11). In S11, the CPU 32 accesses the server apparatus 20 from the communication unit 52, based on the URL including the conference ID. The CPU 32 executes a predetermined sequence with the server apparatus 20, thereby establishing a session with the server apparatus 20. At this time, the CPU 32 controls transmission of own apparatus terminal ID and authority information. The CPU 32 outputs a transmission command of the terminal ID to the communication unit 52. Thereby, the terminal ID is transmitted from the communication unit 52 to the server apparatus 20. The server apparatus 20 transmits the terminal IDs, user names and authority information of the terminal apparatus 30 and counterpart apparatuses 71, 72, 73 to take part in the remote conference identified by the conference ID, to the terminal apparatus 30.

The terminal apparatus 30 receives the terminal IDs, user names and authority information of the terminal apparatus 30 and counterpart apparatuses 71, 72, 73 at the communication unit 52. The CPU 32 acquires the terminal IDs, user names and authority information of the terminal apparatus 30 and counterpart apparatuses 71, 72, 73 through the communication unit 52, and associates and stores the terminal IDs, user names and authority information of the terminal apparatus 30 and counterpart apparatuses 71, 72, 73 in a user table (refer to FIG. 4). The user table is stored and managed in the RAM 36. In the illustrative embodiment, regarding the counterpart apparatus 71, the terminal ID 'USER A', the user name 'Taro' and the authority information 'chairman' are associated and registered. Regarding the counterpart apparatus 72, the terminal ID 'USER B', the user name 'Hanako' and the authority information 'presenter' are associated and registered. Regarding the counterpart apparatus 73, the terminal ID 'USER C', the user name 'Jiro' and the authority information 'participant' are associated and registered. Regarding the terminal apparatus 30, the terminal ID 'USER D', the user name 'Saburo' and the authority information 'participant' are associated and registered.

After the conference connection processing, the CPU 32 starts monitoring processing (S13). Subsequently, the CPU 32 starts material receiving processing (S15). Further, the CPU 32 starts input information receiving processing (S17). The respective processing in S13 to S17 is continuously executed until the remote conference is over, as described later. The respective processing will be described later.

Subsequently, the CPU 32 judges whether a conference ending instruction is acquired (S19). The conference ending instruction is received through the operation unit 40. The CPU 32 acquires the conference ending instruction through the operation unit 40. When a conference ending instruction is not acquired (S19: No), the CPU 32 iteratively executes the corresponding judgment. When a conference ending instruction is acquired (S19: Yes), the CPU 32 sets a conference ending flag to 'ON' (S21). The conference ending flag 'ON' is stored in the RAM 36.

Subsequently, the CPU 32 executes conference disconnection processing (S23). In S23, the CPU 32 performs communication with the server apparatus 20 through the communication unit 52. In the communication, the CPU 32 executes a predetermined sequence of disconnecting the established remote conference session, thereby disconnecting the connection with the server apparatus 20. Thereafter, the CPU 32 ends the main processing.

<Monitoring Processing>

The monitoring processing that is executed in S13 of the main processing shown in FIG. 3 is described with reference to FIG. 5. The CPU 32 having started the monitoring processing judges whether a movement instruction is detected (S31). The movement instruction is an instruction to move a position of the sub-display area 64, in which the captured image 63 is displayed, on the sharing material 61. When the user of the terminal apparatus 30 intends to change a display position of the captured image 63, the user operates the operation unit 40. When a tap on the sub-display area 64 in which the captured image 63 is displayed and a movement performed subsequently to the tap with being tapped are received through the touch pad 42, the CPU 32 detects a movement instruction. When a click on the sub-display area 64 in which the captured image 63 is displayed and a movement performed subsequently to the click with being clicked are received through the mouse, the CPU 32 detects a movement instruction. The movement operation through the touch pad 42 or mouse is a well-known technology referred to as 'drag'.

When a movement instruction is not detected (S31: No), the CPU 32 proceeds to S39. When a movement instruction is detected (S31: Yes), the CPU 32 starts movement starting processing (S33). In the movement starting processing, a brightness of the sharing material 61 displayed in the main display area 62 is lowered by a predetermined amount, for example. The CPU 32 outputs an instruction to lower a brightness of the sharing material 61 to the display unit 38. In response to this, the sharing material 61 is displayed with the brightness thereof being lowered in the main display area 62. Subsequently, the CPU 32 executes arrangement determining processing (S35). The arrangement determining processing will be described later.

Subsequently, the CPU 32 executes movement ending processing (S37). In the movement ending processing, the brightness of the sharing material 61, which was lowered by the predetermined amount in the movement starting processing, is returned to a state before the lowering. In the movement ending processing, guide images 641, 642, 643, 644 displayed in movement candidate calculation processing (refer to FIG. 12 (a first embodiment) or FIG. 19 (a second embodiment)) (which will be described later) are set not to be displayed. Although specifically described later, a part or all of the guide images 641, 642, 643, 644 are displayed in the movement ending processing. The CPU 32 outputs an instruction to return the brightness of the sharing material 61 and an instruction to set a guide image of the guide images 641, 642, 643, 644, which is being displayed, to a non-display to the display unit 38. In response to this, the sharing material 61 is displayed in the main display area 62 at a state before the brightness thereof is lowered. The guide image of the guide images 641, 642, 643, 644, which is being displayed, is not displayed. After executing S37, the CPU 32 proceeds to S39.

In S39, the CPU 32 judges whether the conference ending flag stored in the RAM 36 is 'ON'. When the conference ending flag is not 'ON' (S39: No), the CPU 32 returns to S31 and executes the processing after S31. When the conference ending flag is 'ON' (S39: Yes), the CPU 32 ends the monitoring processing.

<Material Receiving Processing>

Figures 6, 7:
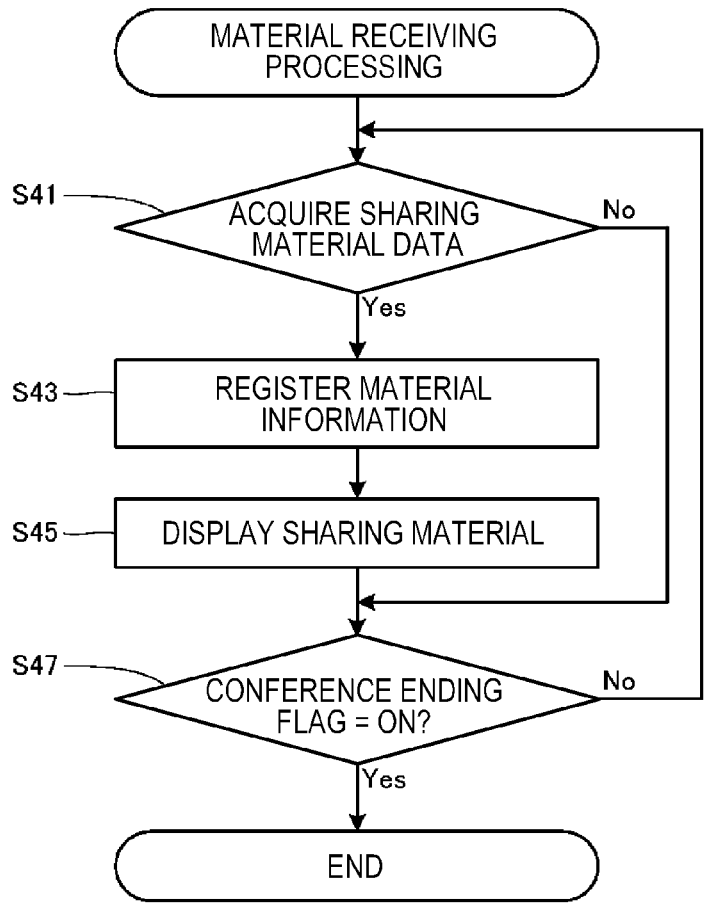
FIG. 6 is a flowchart of material receiving processing.
FIG. 7 shows an example of a material table.

The material receiving processing that is executed in S15 of the main processing shown in FIG. 3 is described with reference to FIG. 6. The CPU 32 having started the material receiving processing judges whether the sharing material data is acquired (S41). The sharing material data is transmitted together with the material ID from the server apparatus 20 and is received at the communication unit 52. The CPU 32 acquires the sharing material data and the material ID through the communication unit 52. When the sharing material data is not acquired (S41: No), the CPU 32 proceeds to S47. When the sharing material data is acquired (S41: Yes), the CPU 32 associates a title of the sharing material 61 corresponding to the acquired sharing material data with the material ID and registers the same in a material table (S43). The title of the sharing material 61 is a file name of the sharing material data, for example.

For example, it is assumed that the sharing material data 'presentation material' (file name) of the material ID 'DOC1' is received at the communication unit 52 and the CPU 32 acquires the same. In this case, the CPU 32 associates the material ID 'DOC1' and the file name 'presentation material' of the sharing material data and registers the same in the material table (refer to FIG. 7). Also, it is assumed that the sharing material data 'supplementary material' (file name) of the material ID 'DOC2' is received at the communication unit 52 and the CPU 32 acquires the same. In this case, the CPU 32 associates the material ID 'DOC2' and the file name 'supplementary material' of the sharing material data and registers the same in the material table (refer to FIG. 7). The material table is stored and managed in the RAM 36.

Subsequently, the CPU 32 controls the display of the sharing material 61 corresponding to the acquired sharing material data (S45). The CPU 32 decodes the acquired sharing material data. The CPU 32 outputs an instruction to display the sharing material 61 obtained by the decoding to the display unit 38. In response to this, the sharing material 61 is displayed in the main display area 62 (refer to FIG. 2). In the illustrative embodiment, the sharing material 61 refers to any one or both of the sharing material corresponding to the sharing material data of which file name is 'presentation material' and the sharing material corresponding to the sharing material data of which file name is 'supplementary material'. After executing S45, the CPU 32 proceeds to S47.

In S47, the CPU 32 judges whether the conference ending flag stored in the RAM 36 is 'ON'. When the conference ending flag is not 'ON' (S47: No), the CPU 32 returns to S41 and executes the processing after S41. Meanwhile, the plurality of sharing material data (file names: presentation material and supplementary material) is respectively acquired by the above iterative processing. When the conference ending flag is 'ON' (S47: Yes), the CPU 32 ends the material receiving processing.

<Arrangement Determining Processing>

Figure 5:
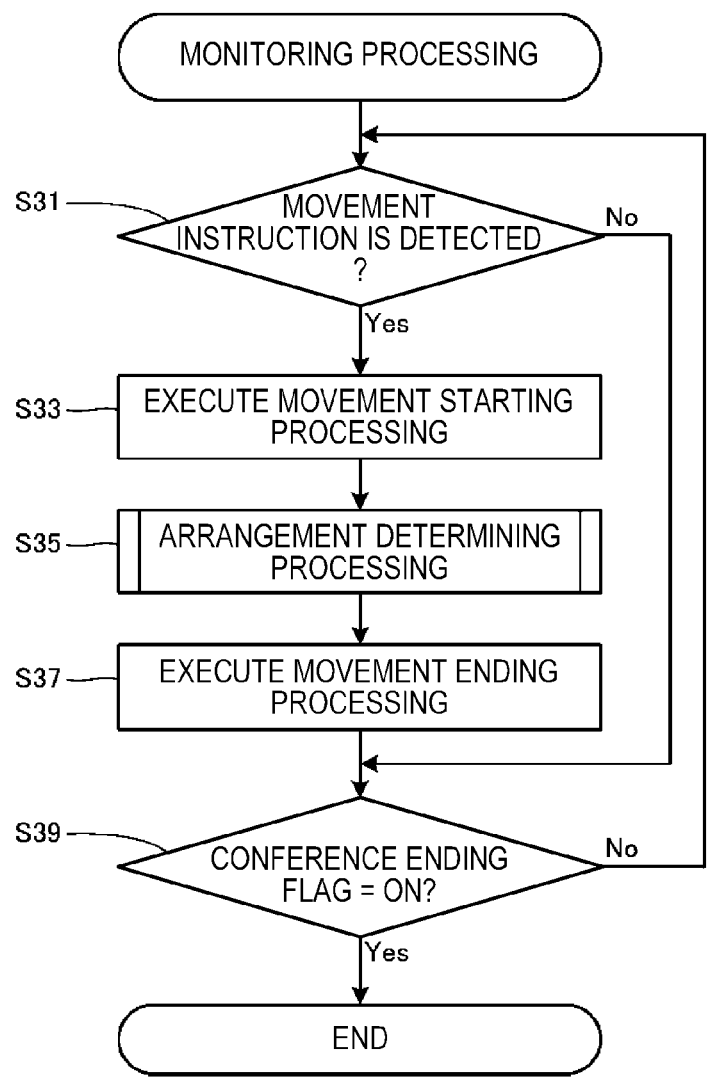
FIG. 5 is a flowchart of monitoring processing.

The arrangement determining processing that is executed in S35 of the monitoring processing shown in FIG. 5 is described with reference to FIG. 8. The CPU 32 having started the arrangement determining processing executes movement candidate calculation processing (S51). The movement candidate calculation processing will be described later. Subsequently, the CPU 32 specifies a candidate area closest to the input position of the movement instruction from the candidate areas 651, 652, 653, 654 (S53). The CPU 32 specifies an input position at which the movement instruction detected in S31 of FIG. 5 is input at timing of S53. In FIG. 2, a black circle having 'IN' of white space therein is illustrated for description of S53 and indicates the input position at which the movement instruction is input at timing of S53. When a position of the black circle (IN) is specified as the input position, the CPU 32 specifies the candidate area 652 as the candidate area closest to the input position of the movement instruction. A distance from the input position is calculated on the basis of predetermined positions of the candidate areas 651, 652, 653, 654. For example, the respective center positions of the candidate areas 651, 652, 653, 654 are reference positions.

Then, the CPU 32 judges whether a priority set for the candidate area specified in S53 is a second value (S55). The second value of the priority is a value that is set for a candidate area, which is judged as an area to which the captured image 63 cannot be moved in the movement candidate calculation processing of S51. The priority is registered with being associated with respective candidate area IDs corresponding to the candidate areas 651, 652, 653, 654 in a movement candidate table (refer to FIG. 13 (a first embodiment) or FIG. 20 (a second embodiment)). In S55, the CPU 32 accesses the movement candidate table to acquire a priority associated with the candidate area ID corresponding to the candidate area specified in S53. When the priority is the second value (S55: Yes), the CPU 32 proceeds to S59. When the priority is not the second value (S55: No), the CPU 32 controls a display update of the captured image 63 (S57). The CPU 32 sets the candidate area specified in S53, as the sub-display area 64. The CPU 32 outputs a command to display the captured image 63 in the newly set sub-display area 64 to the display unit 38. In response to this, the captured image 63 is displayed in the newly set sub-display area 64.

For example, it is assumed that the candidate area 652 is specified in S53, the priority set for the candidate area 652 is a first value or third value other than the second value and a result of the judgment in S55 is negative (S55: No). In this case, the CPU 32 sets the candidate area 652, as the sub-display area 64. The CPU 32 outputs a command to display the captured image 63 in the newly set sub-display area 64 to the display unit 38. In response to this, the captured image 63 is displayed in the sub-display area 64 set as the position of the candidate area 652. The first value, the second value and the third value set as the priority will be described later.

In some cases, there is the annotation 66 overlapping with the sub-display area 64 in which the captured image 63 is displayed before the movement. The CPU 32 accesses an annotation table shown in FIG. 11, which will be described later, and judges whether the annotation 66 exists, in accordance with the registered position information. When it is judged that there is the overlapping annotation 66, the CPU 32 executes the same display control as S65 of FIG. 9 or S95 of FIG. 14, which will be described later. In response to this, the annotation 66 corresponding to the image data associated with the position information overlapping with the sub-display area 64 before the movement is displayed at a position indicated by the position information. After executing S57, the CPU 32 proceeds to S59.

In S59, the CPU 32 judges whether the input of the movement instruction detected in S31 of FIG. 5 is over. The judgment is made depending on whether the movement instruction detected in S31 of FIG. 5 is not detected. That is, when the movement instruction detected in S31 of FIG. 5 is not detected any more, it is judged that the input of the movement instruction is over. When the input of the movement instruction is not over (S59: No), the CPU 32 returns to S51 and executes the processing after S51. When the input of the movement instruction is over (S59: Yes), the CPU 32 ends the arrangement determining processing and returns to S37 of FIG. 5.

<Input Information Receiving Processing and Movement Candidate Calculation Processing>

The input information receiving processing and movement candidate calculation processing are described with reference to two embodiments. The input information receiving processing starts in S17 of the main processing shown in FIG. 3. The movement candidate calculation processing is executed in S51 of the arrangement processing shown in FIG. 8. In the input information receiving processing of the second embodiment, priority calculation processing is executed. In the priority calculation processing, chairman processing, presenter processing and participant processing are executed.

First Embodiment

Input Information Receiving Processing

The input information receiving processing of the first embodiment is described with reference to FIG. 9. The CPU 32 having started the input information receiving processing judges whether the pointer data or annotation data is acquired (S61). The pointer data or annotation data is transmitted from the server apparatus 20 and is received at the communication unit 52. The CPU 32 acquires the pointer data or annotation data through the communication unit 52. When any of the pointer data and the annotation data is not acquired (S61: No), the CPU 32 proceeds to S67. When the pointer data or annotation data is acquired (S61: Yes), the CPU 32 associates and registers the respective information and the like included in the acquired pointer data or annotation data.

It is assumed that the acquired data is the pointer data. In this case, the CPU 32 associates and registers the terminal ID, the material ID and the position information (the X coordinate value and the Y coordinate value), which are included in the pointer data, in a pointer table (refer to FIG. 10). The respective information registered in the pointer table is further associated with a pointer ID. The pointer ID is a serial number assigned to each of the associated and registered information.

It is assumed that the acquired data is the annotation data. In this case, the CPU 32 associates and registers the terminal ID, the material ID, the position information and the image data, which are included in the annotation data, in an annotation table (refer to FIG. 11). The position information includes respective values of an X coordinate (left), an X coordinate (right), a Y coordinate (upper) and a Y coordinate (lower). The terminal ID, the material ID, the position information and the image data registered in the annotation table are further associated with an annotation ID. The annotation ID is a serial number assigned to each of the associated and registered information. The annotation 66 may be input at the terminal apparatus 30. In this case, the CPU 32 registers the respective information, which is included in the annotation data to be transmitted to the server apparatus 20, in the annotation table. In the annotation table shown in FIG. 11, respective records of annotation IDs '1' and '2' are registered on the basis of the annotation data input at the other apparatuses and received at the communication unit 52 via the server apparatus 20. Records of the annotation ID '3' are registered on the basis of the annotation data generated in accordance with the annotation 66 input at the own apparatus.

Subsequently, the CPU 32 controls the display of the pointer 65 or annotation 66, in accordance with the acquired pointer data or annotation data (S65). It is assumed that the acquired data is the pointer data. In this case, the CPU 32 specifies a material ID corresponding to the sharing material 61 being displayed on the own apparatus and judges whether the material ID coincides with the material ID included in the acquired pointer data. When both the material IDs coincide, the CPU 32 decodes the image data corresponding to the pointer 65. The image data corresponding to the pointer 65 is stored with being associated with a program of the input information receiving processing in the storage device 34, for example. The CPU 32 accesses the user table to specify a user name associated with the terminal ID included in the pointer data. Upon the decoding of the image data, the CPU 32 adds the specified user name to the image data and generates the pointer 65 having the user name added thereto (refer to FIG. 2). The CPU 32 outputs to the display unit 38 a display instruction to display the generated pointer 65 at a position indicated by the position information included in the pointer data. In response to this, the pointer 65 having the user name added thereto is displayed over the sharing material 61 displayed in the main display area 62. As described above, the pointer 65 shown in FIG. 2 corresponds to a pointer of the terminal ID 'USER B' (refer to FIG. 4).

When the material ID corresponding to the sharing material 61 being displayed and the material ID included in the pointer data do not coincide with each other, the CPU 32 does not control the display of the pointer 65. In this case, the pointer 65 is not displayed. Also, the position at which the pointer 65 is displayed may overlap with the sub-display area 64 in which the captured image 63 is displayed. In this case, the captured image 63 may be preferentially displayed and the pointer 65 may not be displayed.

It is assumed that the acquired data is the annotation data. In this case, the CPU 32 specifies a material ID corresponding to the sharing material 61 being displayed on the own apparatus and judges whether the material ID coincides with the material ID included in the acquired annotation data. When both the material IDs coincide, the CPU 32 decodes the image data included in the annotation data. The CPU 32 outputs to the display unit 38 a display instruction to display the generated annotation 66 at a position indicated by the position information included in the annotation data. In response to this, the annotation 66 is displayed over the sharing material 61 displayed in the main display area 62.

When the material ID corresponding to the sharing material 61 being displayed and the material ID included in the annotation data do not coincide with each other, the CPU 32 does not control the display of the annotation 66. In this case, the annotation 66 is not displayed. Also, the position at which the annotation 66 is displayed may overlap with the sub-display area 64 in which the captured image 63 is displayed. In this case, the captured image 63 is preferentially displayed and the annotation 66 is not displayed. After executing S65, the CPU 32 proceeds to S67.

Figure 2:
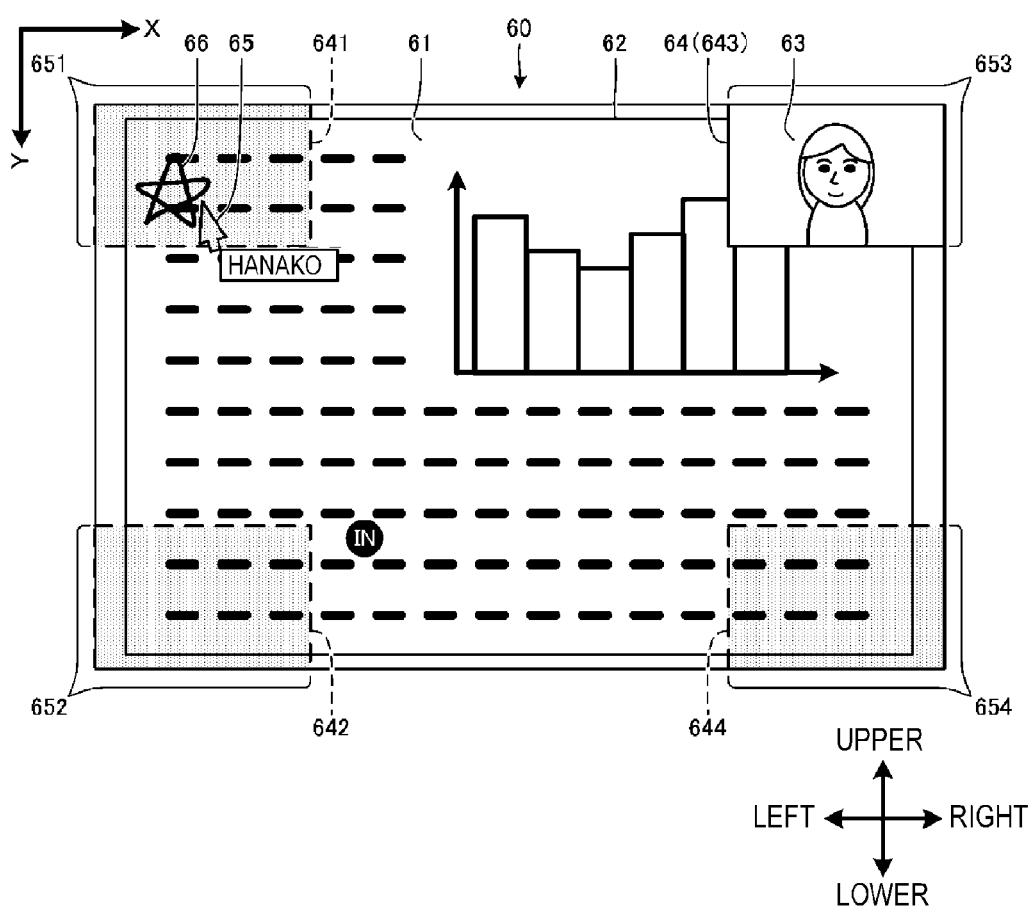
FIG. 2 illustrates an example of a remote conference screen.
Figures 9, 10, 11:
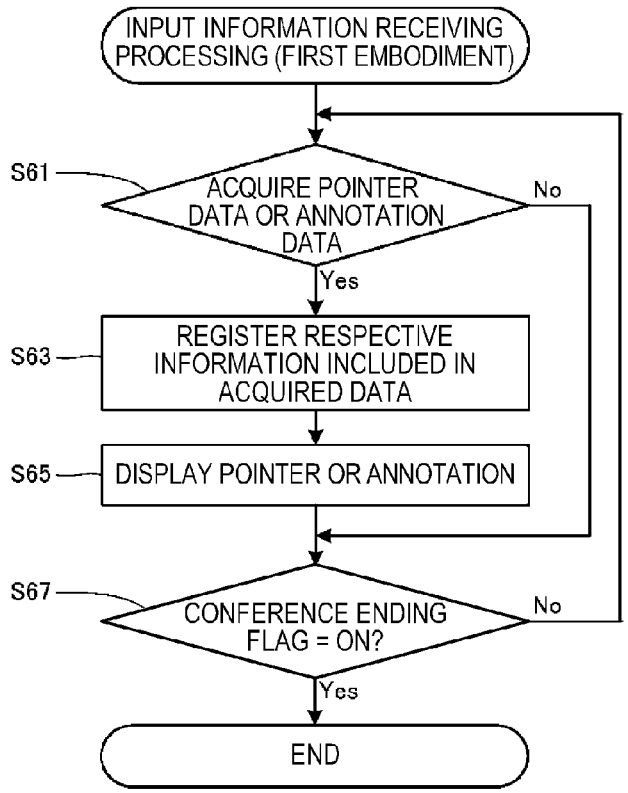
FIG. 9 is a flowchart of input information receiving processing of a first embodiment.
FIG. 10 shows an example of a pointer table.
FIG. 11 shows an example of an annotation table.

Regarding a relation between each position information registered in the pointer table shown in FIG. 10 and the display position of the pointer 65 shown in FIG. 2, the respective coordinate values as the position information shown in FIG. 10 are arbitrarily exemplified values for descriptions and the pointer 65 shown in FIG. 2 is also exemplified at the arbitrary position for descriptions. Regarding a relation between each position information registered in the annotation table shown in FIG. 11 and the display position and display size of the annotation 66 shown in FIG. 2, the respective coordinate values as the position information shown in FIG. 11 are arbitrarily exemplified values for descriptions and the annotation 66 shown in FIG. 2 is also exemplified with an arbitrary size at the arbitrary position for descriptions.

In S67, the CPU 32 judges whether the conference ending flag stored in the RAM 36 is 'ON'. When the conference ending flag is not 'ON' (S67: No), the CPU 32 returns to S61 and executes the processing after S61. When the conference ending flag is 'ON' (S67: Yes), the CPU 32 ends the input information receiving processing of the first embodiment.

<Movement Candidate Calculation Processing>

The movement candidate calculation processing of a first embodiment is described with reference to FIG. 12. The CPU 32 having started the movement candidate calculation processing associates the respective position information of the candidate areas 651, 652, 653, 654 with the candidate area IDs and registers the same in a movement candidate table (refer to S71 and FIG. 13). As described above, in the illustrative embodiment, the candidate areas 651, 652, 653, 654 are specified as the rectangular areas. Therefore, the respective position information of the candidate areas 651, 652, 653, 654 includes respective values of an X coordinate 'left' and a Y coordinate 'upper' corresponding to a left-upper corner of the rectangular area and respective values of an X coordinate 'right' and a Y coordinate 'lower' corresponding to a right-lower corner of the rectangular area. In the illustrative embodiment, regarding the respective position information of the annotation 66 and candidate areas 651, 652, 653, 654, the X coordinate 'left' is referred to as 'X left', the Y coordinate 'upper' is referred to as 'Y upper', the X coordinate 'right' is referred to as 'X right' and the Y coordinate 'lower' is referred to as 'Y lower'.

The candidate area ID is information for identifying each of the candidate areas 651, 652, 653, 654. In the illustrative embodiment, the respective candidate IDs of the candidate areas 651, 652, 653, 654 are set as follows. The candidate area ID of the candidate area 651 is set to '651'. The candidate area ID of the candidate area 652 is set to '652'. The candidate area ID of the candidate area 653 is set to '653'. The candidate area ID of the candidate area 654 is set to '654'. The respective position information of the candidate areas 651, 652, 653, 654 is registered in the program of the movement candidate calculation processing of the first embodiment, for example. The movement candidate table is stored and managed in the RAM 36.

The CPU 32 selects, as a processing target, one of the candidate areas 651, 652, 653, 654 registered in the movement candidate table (S73). A candidate area to be selected is a candidate area, which has not been as the processing target in S73, of the candidate areas 651, 652, 653, 654. The CPU 32 stores the candidate area ID of the selected candidate area in the RAM 36 whenever executing S73. In S73, the CPU 32 specifies the candidate area ID not stored in the RAM 36, as a candidate area ID not selected as the processing target. The CPU 32 reads out the position information of the candidate area of the processing target from the movement candidate table and stores the same in the RAM 36. The position information stored in the RAM 36 is used in S75 and S77, which will be described later. Subsequently, the CPU 32 judges whether the position information of the candidate area of the processing target coincides with the position information registered in the pointer table (S75). The position information registered in the pointer table, which is a comparison target, is position information that is associated with a predetermined terminal ID and a predetermined material ID. The predetermined terminal ID is a terminal ID associated with the authentication information 'chairman' or 'presenter' in the user table. The predetermined material ID is a material ID corresponding to the sharing material 61 being displayed in the main display area 62. The CPU 32 accesses the user table stored in the RAM 36 to specify the terminal ID of which authentication information is 'chairman' or 'presenter'. The specified terminal ID is stored in the RAM 36. The CPU 32 specifies the material ID of the sharing material 61 being displayed. The CPU 32 accesses the pointer table to specify the position information associated with the specified terminal ID and material ID.

Figures 13, 14:
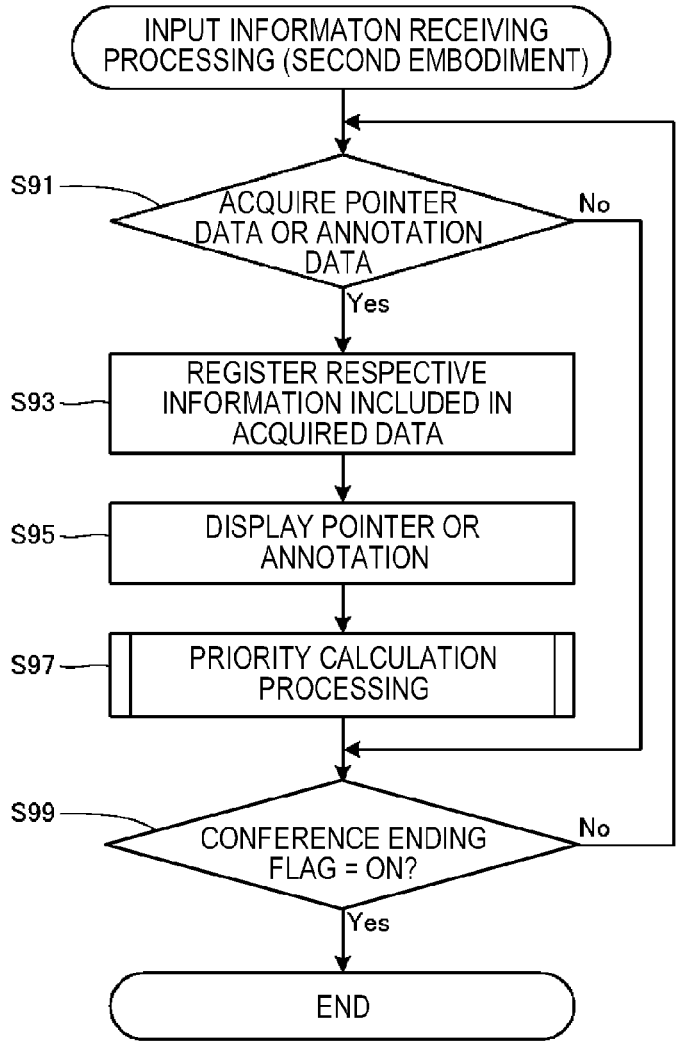
FIG. 13 shows an example of a movement candidate table of the first embodiment.
FIG. 14 is a flowchart of input information receiving processing of a second embodiment.

For example, it is assumed that the candidate area of the processing target is the candidate area 651 and the sharing material 61 being displayed is a material corresponding to the material ID 'DOC1'. Also, it is assumed that the registration state of the user table is as shown in FIG. 4, the registration state of the pointer table is as shown in FIG. 10 and the registration state of the movement candidate table is as shown in FIG. 13. At this time, the priority is not registered yet in the movement candidate table, at this timing.

The CPU 32 specifies the terminal ID 'USER A' of which authentication information is 'chairman' and the terminal ID 'USER B' of which authentication information is 'presenter' from the user table. The specified terminal IDs 'USER A' and 'USER B' are stored in the RAM 36. The CPU 32 specifies the position information '(X, Y)=(50, 60)' associated with the terminal ID 'USER A' and material ID 'DOC1' from the pointer table. The CPU 32 compares the position information '(X left, X right, Y upper, Y lower)=(0, 320, 0, 240)' with '(X, Y)=(50, 60)'. In this case, the CPU 32 judges that the respective position information overlaps. The position information '(X left, X right, Y upper, Y lower)=(0, 320, 0, 240)' of the candidate area 651 has been stored in the RAM 36 in S73. In the pointer table shown in FIG. 10, a pointer ID associated with the terminal ID 'USER B' and the material ID 'DOC1' is not registered yet. Therefore, the position information associated with the terminal ID 'USER B' and the material ID 'DOC1' is not specified.

In contrast to FIG. 10, it is assumed in the registration state of the pointer table that the pointer ID is '1' and the position information associated with the terminal ID 'USER A' and the material ID 'DOC1' is '(X, Y)=(1180, 940)'. In this case, the CPU 32 compares the position information '(X left, X right, Y upper, Y lower)=(0, 320, 0, 240)' with '(X, Y)=(1180, 940)' and judges that the respective position information does not overlap.

When the respective position information overlaps (S76: Yes), the CPU 32 proceeds to S79. When the respective position information does not overlap (S76: No), the CPU 32 proceeds to S77. Depending on the registration state of the pointer table, a plurality of position information associated with the terminal IDs (the authentication information is 'chairman' or 'presenter') for which material IDs coincide may be specified. When the position information of the candidate area of the processing target and at least one of the specified position information overlap with each other, a result of the judgment in S75 is positive (S75: Yes). In other words, when the position information of the candidate area of the processing target and all of the specified position information do not overlap with each other, a result of the judgment in S75 is negative (S75: No).

In S77, the CPU 32 judges whether the position information of the candidate area of the processing target overlaps with the position information registered in the annotation table. The position information registered in the annotation table, which is a comparison target, is position information that is associated with a predetermined terminal ID and a predetermined material ID. The predetermined terminal ID is a terminal ID associated with the authentication information 'chairman' or 'presenter' in the user table. The predetermined material ID is a material ID corresponding to the sharing material 61 being displayed in the main display area 62. The CPU 32 accesses the annotation table to specify the position information associated with the terminal ID of which authentication information is 'chairman' or 'presenter', which is specified in S75, and the material ID corresponding to the sharing material 61 being displayed.

For example, it is assumed that the candidate area of the processing target is the candidate area 651 and the sharing material 61 being displayed is a material corresponding to the material ID 'DOC1'. Also, it is assumed that the registration state of the user table is as shown in FIG. 4, the registration state of the pointer table is as shown in FIG. 11 and the registration state of the movement candidate table is as shown in FIG. 13. At this time, the priority is not registered yet in the movement candidate table, at this timing.

The CPU 32 specifies the position information '(X left, X right, Y upper, Y lower)=(10, 50, 20, 60)' associated with the terminal ID 'USER B' of which authentication information is 'presenter', which is specified in S75 and stored in the RAM 36, and the material ID 'DOC1'. The CPU 32 compares the position information '(X left, X right, Y upper, Y lower)=(0, 320, 0, 240)' with '(X left, X right, Y upper, Y lower)=(10, 50, 20, 60)'. In this case, the CPU 32 judges that the respective position information overlaps. The position information '(X left, X right, Y upper, Y lower)=(0, 320, 0, 240)' of the candidate area 651 has been stored in the RAM 36 in S73. In the annotation table shown in FIG. 11, an annotation ID associated with the terminal ID 'USER A' and the material ID 'DOC1' is not registered yet. Therefore, the position information associated with the terminal ID 'USER A' and the material ID 'DOC1' is not specified.

In contrast to FIG. 11, it is assumed in the registration state of the annotation table that the annotation ID is '1' and the position information associated with the terminal ID 'USER B' and the material ID 'DOC1' is '(X left, X right, Y upper, Y lower)=(200, 300, 300, 450)'. In this case, the CPU 32 compares the position information '(X left, X right, Y upper, Y lower)=(0, 320, 0, 240)' with '(X left, X right, Y upper, Y lower)=(200, 300, 300, 450)' and judges that the respective position information does not overlap.

When the respective position information overlaps (S77: Yes), the CPU 32 proceeds to S79. When the respective position information does not overlap (S77: No), the CPU 32 proceeds to S81. In some cases, a plurality of position information associated with the terminal IDs (the authentication information is 'chairman' or 'presenter') of which material IDs coincide may be specified. When the position information of the candidate area of the processing target and at least one of the specified position information overlap with each other, a result of the judgment in S77 is positive (S75: Yes). In other words, when the position information of the candidate area of the processing target and all of the specified position information do not overlap with each other, a result of the judgment in S77 is negative (S77: No).

In S79, the CPU 32 sets a second value, as the priority. The CPU 32 associates the set priority value with the candidate area ID of the candidate area of the processing target and registers the same in the movement candidate table. In the illustrative embodiment, the second value is '0'. Therefore, the CPU 32 associates the priority '0' with the candidate area ID of the candidate area of the processing target and registers the same in the movement candidate table (refer to the priority associated with the candidate area ID '651' in FIG. 13). Subsequently, the CPU 32 sets a guide image corresponding to the candidate area of the processing target, as a non-display (S81) and then proceeds to S87. For example, it is assumed that the candidate area of the processing target is the candidate area 651. In this case, the guide image 641 corresponding to the candidate area 651 is not displayed. FIG. 2 illustrates the remote conference screen 60. Therefore, FIG. 2 does not conform to the above-described embodiment.

The control that is executed by the CPU 32 in S81 is described. It is assumed that the candidate area of the processing target is the candidate area 651. The CPU 32 decodes the image data corresponding to the guide image 641. At this time, the CPU 32 sets 100% as transmittance of the image data corresponding to the guide image 641. An image of which transmittance is 100% becomes colorless and transparent. The respective image data corresponding to the respective guide images 641, 642, 643, 644 is stored in the storage device 34 with being associated with the program of the movement candidate calculation processing of the first embodiment, for example. The CPU 32 outputs a display instruction to display the generated colorless and transparent guide image 641 at a position indicated by the position information associated with the candidate area ID '651' in the movement candidate table, to the display unit 38. In response to this, the colorless and transparent guide image 641 is displayed at the position indicated by the position information. The guide image 641 of which transmittance is 100% is not visually recognized, depending on the user of the terminal apparatus 30. That is, the guide image 641 is a non-display to the user of the terminal apparatus 30. In addition, in S81, the CPU 32 may not execute the decoding of the image data corresponding to the guide image and the output of the display instruction to the display unit 38. In this case, the CPU 32 proceeds to S87 after executing S79. The transmittance will be described later.

In S83, the CPU 32 sets a first value, as the priority. The CPU 32 associates the set priority value with the candidate area ID of the candidate area of the processing target and registers the same in the movement candidate table. In the illustrative embodiment, the first value is '1'. Therefore, the CPU 32 associates the priority '1' with the candidate area ID of the candidate area of the processing target and registers the same in the movement candidate table (refer to the priorities associated with the candidate areas ID '652', '653' and '654' in FIG. 13). Subsequently, the CPU 32 controls the display of the guide image corresponding to the candidate area of the processing target (S85). For example, it is assumed that the candidate area of the processing target is the candidate area 652. The CPU 32 decodes the image data corresponding to the guide image 642. The CPU 32 outputs a display instruction to display the generated guide image 642 at a position indicated by the position information associated with the candidate area ID '652' in the movement candidate table, to the display unit 38. In response to this, the guide image 642 is displayed at the position indicated by the position information (refer to FIG. 2). The guide image displayed in S85 has transmittance of 0%. After executing S85, the CPU 32 proceeds to S87.

In S87, the CPU 32 judges whether the processing of S73 to S85 has been executed for all of the candidate areas 651, 652, 653, 654 registered in the movement candidate table. The CPU 32 performs the processing of S87 by judging whether there is a candidate area ID not stored in the RAM 36. When the processing of S73 to S85 has not been executed for all of the candidate areas 651, 652, 653, 654 (S87: No), the CPU 32 returns to S73 and executes the processing after S73. When returning to S73, the CPU 32 deletes the position information of the candidate areas stored in the RAM 36 in S73. When the processing of S73 to S85 has been executed for all of the candidate areas 651, 652, 653, 654 (S87: Yes), the CPU 32 ends the movement candidate calculation processing of the first embodiment and returns to S53 of FIG. 8. Upon the ending, the CPU 32 deletes the candidate area IDs stored in the RAM 36 in S73.

Second Embodiment

Input Information Receiving Processing

The input information receiving processing of a second embodiment is described with reference to FIG. 14. The CPU 32 having started the input information receiving processing sequentially executes S91 to S95. S91 to S95 correspond to S61 to S65 of the input information receiving processing (refer to FIG. 9) of the first embodiment. The CPU 32 executes S91 to S95 in the same manner as the above embodiment. When any of the pointer data and the annotation data is not acquired (S91: No), the CPU 32 proceeds to S99. The other descriptions about S91 to S95 are omitted. After executing S95, the CPU 32 executes priority calculation processing (S97). The priority calculation processing will be described later. After executing S97, the CPU 32 proceeds to S99.

In S99, the CPU 32 judges whether the conference ending flag stored in the RAM 36 is 'ON'. When the conference ending flag is not 'ON' (S99: No), the CPU 32 returns to S91 and executes the processing after S91. When conference ending flag is 'ON' (S99: Yes), the CPU 32 ends the input information receiving processing of the second embodiment.

<Priority Calculation Processing>

The priority calculation processing, which is executed in S97 of the input information receiving processing of the second embodiment shown in FIG. 14, is described with reference to FIG. 15. The CPU 32 having started the priority calculation processing selects one of the candidate areas 651, 652, 653, 654 registered in a movement candidate table (refer to FIG. 20) in S181 of FIG. 19, which will be described later (S101). A candidate area to be selected is a candidate area, which has not been selected as a processing target in S101, of the candidate areas 651, 652, 653, 654. The CPU 32 stores the candidate area ID of the selected candidate area in the RAM 36 whenever executing S101. In S101, the CPU 32 specifies the candidate area ID not stored in the RAM 36, as a candidate area ID not selected as the processing target. The CPU 32 reads out the position information of the candidate area selected as the processing target from the movement candidate table and stores the same in the RAM 36.

Subsequently, the CPU 32 executes chairman processing (S103). Then, the CPU 32 executes presenter processing (S105). After that, the CPU 32 executes participant processing (S107). The chairman processing, the presenter processing and the participant processing will be described later.

Subsequently, the CPU 32 calculates the priority (S109). The priority is obtained by multiplying a chairman priority (HP), a presenter priority (PP) and a participant priority (AP) each other. The chairman priority (HP) is a priority calculated in the chairman processing. The presenter priority (PP) is a priority calculated in the presenter processing. The participant priority (AP) is a priority calculated in the participant processing. The priority set in the priority calculation processing is within a range of '0≤priority≤1'. The CPU 32 associates the calculated priority with the candidate area of the processing target and registers the same in the movement candidate table. After the registration, the CPU 32 deletes the chairman priority (HP), the presenter priority (PP) and the participant priority (AP) stored in the RAM 36 in respective processing (refer to S129 or S131 of FIG. 16, S157 of FIG. 17 and S177 of FIG. 18), which will be described later.

After executing S109, the CPU 32 judges whether S101 to S109 have been executed for all the candidate areas 651, 652, 653, 654 registered in the movement candidate table (S111). The CPU 32 performs the processing of S11 by judging whether there is a candidate area ID not stored in the RAM 36. When S101 to S109 have not been executed for all the candidate areas 651, 652, 653, 654 (S111: No), the CPU 32 returns to S101 and executes the processing after S101. When S101 to S109 have been executed for all the candidate areas 651, 652, 653, 654 (S111: Yes), the CPU 32 ends the priority calculation processing and then returns to S99 of FIG. 14. Upon the ending, the CPU 32 deletes the candidate area IDs stored in the RAM 36 in S101.

<Chairman Processing>

Figure 15:
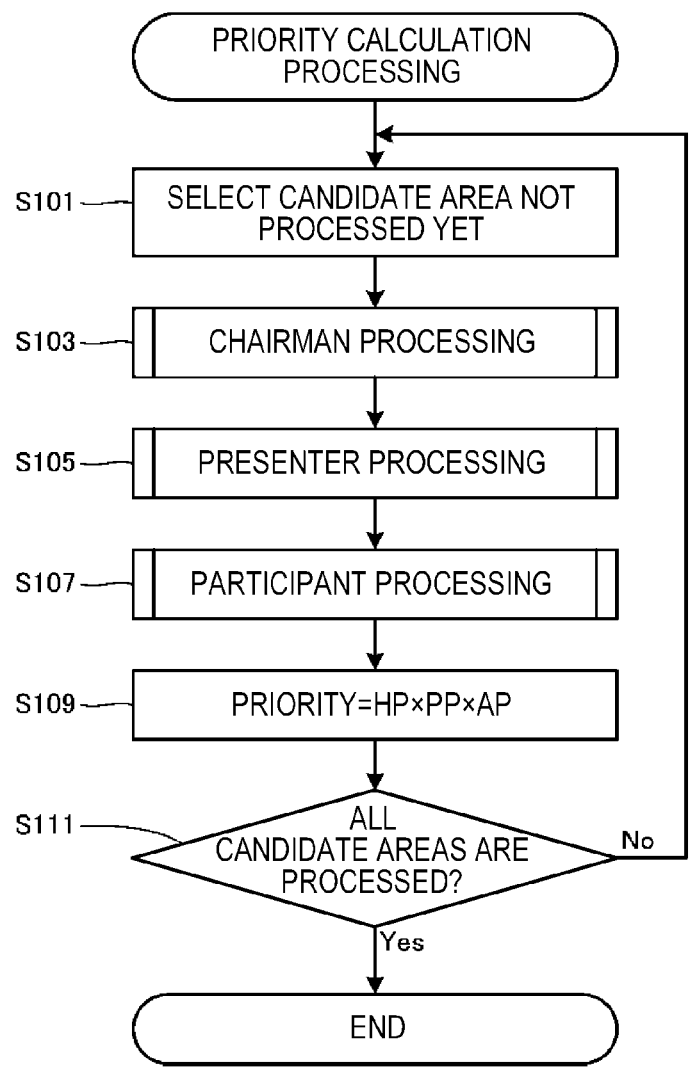
FIG. 15 is a flowchart of priority calculation processing.
Figure 16:
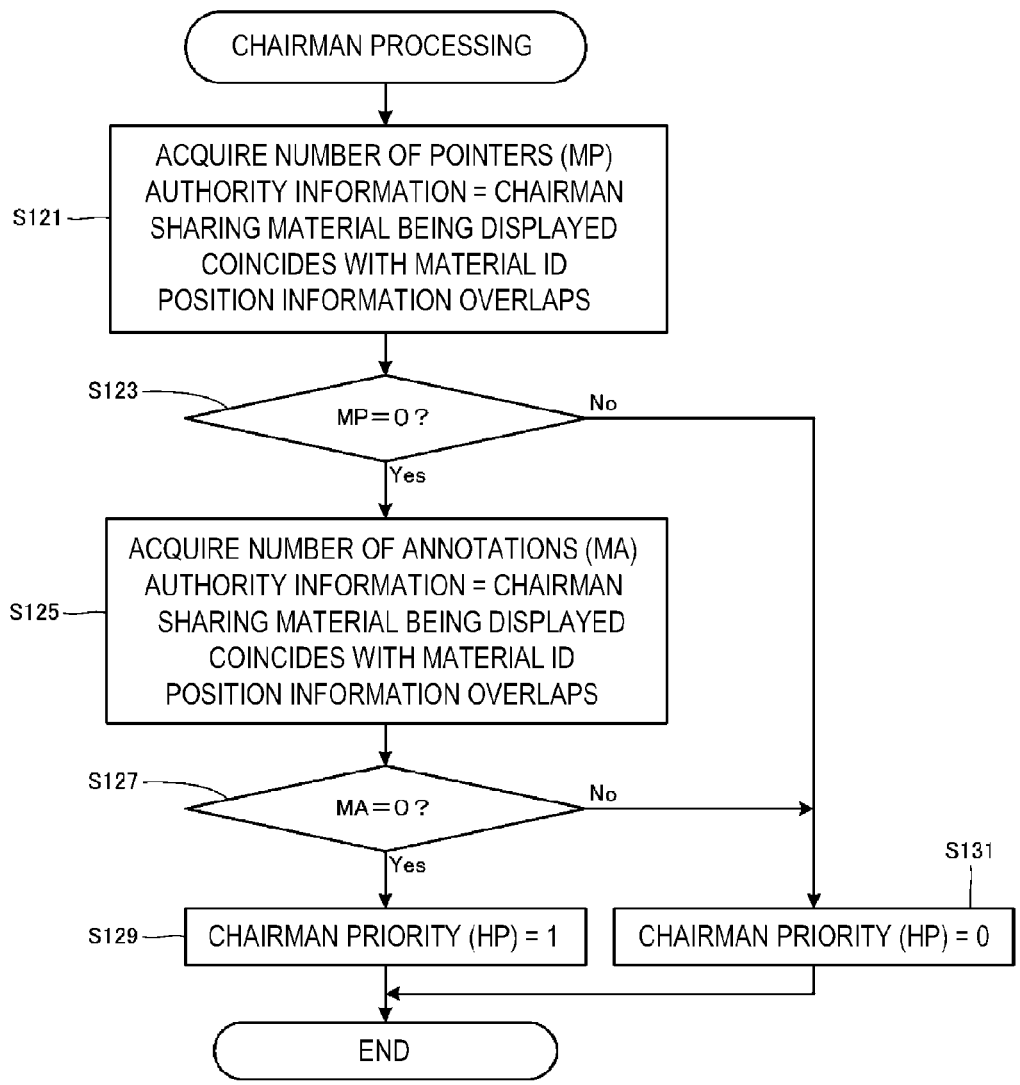
FIG. 16 is a flowchart of chairman processing.

The chairman processing that is executed in S103 of the priority calculation processing shown in FIG. 15 is described with reference to FIG. 16. The chairman processing is executed for the candidate area selected as the processing target in S101 of FIG. 15. The CPU 32 having started the chairman processing accesses the user table, the pointer table and the movement candidate table to acquire a number of pointers (MP) (S121). The number of pointers (MP) indicates a number of pointer IDs of all the pointer IDs registered in the pointer table, for which the material ID coincides with the material ID corresponding to the sharing material 61 being displayed and the position information overlaps with the position information of the candidate area of the processing target with respect to the terminal ID of which authentication information is 'chairman'. When specifying the terminal ID of which authentication information is 'chairman', the CPU 32 accesses the user table. When specifying the position information of the candidate area of the processing target, the CPU 32 accesses the movement candidate table. The terminal ID of which authentication information is 'chairman' and the position information of the candidate area of the processing target are stored in the RAM 36.

For example, it is assumed that the candidate area of the processing target is the candidate area 651 and the sharing material 61 being displayed is a material corresponding to the material ID 'DOC2'. Also, it is assumed that the registration state of the user table is as shown in FIG. 4, the registration state of the pointer table is as shown in FIG. 10 and the registration state of the movement candidate table is as shown in FIG. 20. At this time, the priority is not registered yet in the movement candidate table, at this timing.

The CPU 32 specifies the terminal ID 'USER A' of which authentication information is 'chairman'. The specified terminal ID 'USER A' is stored in the RAM 36. In the pointer table shown in FIG. 10, the pointer ID, which is associated with the terminal ID 'USER A' of which authentication information is 'chairman', which is stored in the RAM 36, and the material ID 'DOC2', is not registered yet. Therefore, the position information associated with the terminal ID 'USER A' and the material ID 'DOC2' is not specified. As a result, the CPU 32 acquires the number of pointers (MP) '0'.

In contrast to FIG. 10, it is assumed in the registration state of the pointer table that the pointer ID is '1', the material ID associated with the terminal ID 'USER A' is 'DOC2' and the position information is '(X, Y)=(50, 60)'. The CPU 32 specifies the terminal ID 'USER A' of which authentication information is 'chairman' from the user table. The specified terminal ID 'USER A' is stored in the RAM 36. The CPU 32 specifies the position information '(X, Y)=(50, 60)' associated with the terminal ID 'USER A' and the material ID 'DOC2' from the pointer table. The CPU 32 reads out the position information '(X left, X right, Y upper, Y lower)=(0, 320, 0, 240)' of the candidate area 651 of the processing target from the movement candidate table and stores the same in the RAM 36. The CPU 32 compares the position information '(X left, X right, Y upper, Y lower)=(0, 320, 0, 240)' with '(X, Y)=(50, 60)'. In this case, the CPU 32 judges that the respective position information overlaps. As a result, the CPU 32 acquires the number of pointers (MP) '1'. The number of pointers (MP) acquired in S121 is stored in the RAM 36.

After executing S121, the CPU 32 judges whether the number of pointers (MP) is '0' (S123). When the number of pointers (MP) is '0' (S123: Yes), the CPU 32 accesses the annotation table to acquire a number of annotations (MA) (S125). The number of annotations (MA) indicates a number of annotation IDs of all the annotation IDs registered in the annotation table, for which the material ID coincides with the material ID corresponding to the sharing material 61 being displayed and the position information overlaps with the position information of the candidate area of the processing target with respect to the terminal ID of which authentication information is 'chairman'.

For example, it is assumed that the candidate area of the processing target is the candidate area 651 and the sharing material 61 being displayed is a material corresponding to the material ID 'DOC2'. Also, it is assumed that the registration state of the user table is as shown in FIG. 4, the registration state of the annotation table is as shown in FIG. 11 and the registration state of the movement candidate table is as shown in FIG. 20. At this time, the priority is not registered yet in the movement candidate table, at this timing. In the annotation table shown in FIG. 11, the annotation ID associated with the terminal ID 'USER A' of which authentication information is 'chairman', which is stored in the RAM 36, is not registered yet. Therefore, the position information associated with the terminal ID 'USER A' and the material ID 'DOC2' is not specified. As a result, the CPU 32 acquires the number of annotations (MA) '0'.

In contrast to FIG. 11, it is assumed in the registration state of the annotation table that the annotation ID is '1' and the terminal ID 'USER A', the material ID 'DOC2' and the position information '(X left, X right, Y upper, Y lower)=(10, 50, 20, 60)' are associated and registered. The CPU 32 compares the position information '(X left, X right, Y upper, Y lower)=(0, 320, 20, 240)' with '(X left, X right, Y upper, Y lower)=(10, 50, 20, 60)'. In this case, the CPU 32 judges that the respective position information overlaps. As a result, the CPU 32 acquires the number of annotations (MA) '1'. The position information '(X left, X right, Y upper, Y lower)=(0, 320, 20, 240)' of the candidate area 651 is stored in the RAM 36 in S121. The number of annotations (MA) acquired in S125 is stored in the RAM 36.

After executing S125, the CPU 32 judges whether the acquired number of annotations (MA) is '0' (S127). When the number of annotations (MA) is '0' (S127: Yes), the CPU 32 sets '1' as the chairman priority (HP) (S129). When the number of pointers (MP) is not '0' (S123: No) or when the number of annotations (MA) is not '0' (S127: No), the CPU 32 sets '0' as the chairman priority (HP) (S131). The chairman priority (HP) '0' or '1' set in S129 or S131 is stored in the RAM 36. After executing S129 or S131, the CPU 32 ends the chairman processing and returns to S105 of FIG. 15. Upon the ending, the CPU 32 deletes the terminal ID of which authentication information is 'chairman' and the number of pointers (MP) stored in the RAM 36 in S121 and the number of annotations (MA) stored in the RAM 36 in S125.

<Presenter Processing>

The presenter processing that is executed in S105 of the priority calculation processing shown in FIG. 15 is described with reference to FIG. 17. The presenter processing is executed for the candidate area selected as the processing target in S101 of FIG. 15. The CPU 32 having started the presenter processing accesses the user table and the pointer table to acquire the numbers of pointers (NP1, NP2) (S141). The number of pointers (NP1) indicates a number of pointer IDs of all the pointer IDs registered in the pointer table, for which the material ID coincides with the material ID corresponding to the sharing material 61 being displayed with respect to the terminal ID of which authentication information is 'presenter'. The number of pointers (NP2) indicates a number of pointer IDs of all the pointer IDs registered in the pointer table, for which the material ID coincides with the material ID corresponding to the sharing material 61 being displayed and the position information overlaps with the position information of the candidate area of the processing target with respect to the terminal ID of which authentication information is 'presenter'. When specifying the terminal ID of which authentication information is 'presenter', the CPU 32 accesses the user table. The terminal ID of which authentication information is 'presenter' is stored in the RAM 36.

For example, it is assumed that the candidate area of the processing target is the candidate area 651 and the sharing material 61 being displayed is a material corresponding to the material ID 'DOC2'. Also, it is assumed that the registration state of the user table is as shown in FIG. 4, the registration state of the pointer table is as shown in FIG. 10 and the registration state of the movement candidate table is as shown in FIG. 20. At this time, the priority is not registered yet in the movement candidate table, at this timing.

The CPU 32 specifies the terminal ID 'USER B' of which authentication information is 'presenter' from the user table. The specified terminal ID 'USER B' is stored in the RAM 36. The CPU 32 specifies the pointer ID '2' associated with the terminal ID 'USER B' and the material ID 'DOC2' from the pointer table. As a result, the CPU 32 acquires the number of pointers (NP1) '1'. The CPU 32 specifies the position information '(X, Y)=(80, 70)' associated with the terminal ID 'USER B' and the material ID 'DOC2' from the pointer table. The CPU 32 compares the position information '(X left, X right, Y upper, Y lower)=(0, 320, 20, 240)' with '(X, Y)=(70, 80)'. In this case, the CPU 32 judges that the respective position information overlaps. As a result, the CPU 32 acquires the number of pointers (NP2) '1'. The position information '(X left, X right, Y upper, Y lower)=(0, 320, 20, 240)' of the candidate area 651 is stored in the RAM 36 in S121 of FIG. 16.

In contrast to FIG. 10, it is assumed in the registration state of the pointer table that the pointer ID is '2' and the position information associated with the terminal ID 'USER B' and the material ID 'DOC2' is '(X, Y)=(1180, 940)'. The CPU 32 specifies the terminal ID 'USER B' of which authentication information is 'presenter' from the user table. The specified terminal ID 'USER B' is stored in the RAM 36. The CPU 32 specifies the pointer ID '2' associated with the terminal ID 'USER B' and the material ID 'DOC2' from the pointer table. As a result, the CPU 32 acquires the number of pointers (NP1) '1'. The CPU 32 specifies the position information '(X, Y)=(1180, 940)' associated with the terminal ID 'USER B' and the material ID 'DOC2' from the pointer table. The CPU 32 compares the position information '(X left, X right, Y upper, Y lower)=(0, 320, 20, 240)' with '(X, Y)=(1180, 940)'. In this case, the CPU 32 judges that the respective position information does not overlap. As a result, the CPU 32 acquires the number of pointers (NP2) '0'. The numbers of pointers (NP1, NP2) acquired in S141 are all stored in the RAM 36.

After executing S141, the CPU 32 judges whether the acquired number of pointers (NP1) is '0' (S143). When the number of pointers (NP1) is '0' (S143: Yes), the CPU 32 sets '1' as a presenter pointer priority (S145). When the number of pointers (NP1) is not '0' (S143: No), the CPU 32 sets a value calculated by an equation '1−(number of pointers (NP2)/number of pointers (NP1))', as the presenter pointer priority (S147). The presenter pointer priority set in S145 or S147 is stored in the RAM 36.

After executing S145 or S147, the CPU 32 accesses the annotation table to acquire numbers of annotations (NA1, NA2) (S149). The number of annotations (NA1) indicates a number of annotation IDs of all the annotation IDs registered in the annotation table, for which the material ID coincides with the material ID corresponding to the sharing material 61 being displayed with respect to the terminal ID of which authentication information is 'presenter'. The number of annotations (NA2) indicates a number of annotation IDs for which the material ID coincides with the material ID corresponding to the sharing material 61 being displayed and the position information overlaps with the position information of the candidate area of the processing target with respect to the terminal ID of which authentication information is 'presenter'.

For example, it is assumed that the candidate area of the processing target is the candidate area 651 and the sharing material 61 being displayed is a material corresponding to the material ID 'DOC2'. Also, it is assumed that the registration state of the user table is as shown in FIG. 4, the registration state of the annotation table is as shown in FIG. 11 and the registration state of the movement candidate table is as shown in FIG. 20. At this time, the priority is not registered yet in the movement candidate table, at this timing. In the annotation table shown in FIG. 11, the annotation ID associated with the terminal ID 'USER B' of which authentication information is 'presenter', which is stored in the RAM 36 in S141, and the material ID 'DOC2', is not registered yet. Therefore, the position information associated with the terminal ID 'USER B' and the material ID 'DOC2' is not specified. As a result, the CPU 32 acquires the number of annotations (NA1) '0' and the number of annotations (NA1) '1'

In contrast to FIG. 11, it is assumed in the registration state of the annotation table that the annotation ID is '1' and the terminal ID 'USER B', the material ID 'DOC2' and the position information '(X left, X right, Y upper, Y lower)=(10, 50, 20, 60)' are associated and registered. The CPU 32 specifies the annotation ID '1 associated with the terminal ID 'USER B' and the material ID 'DOC2' from the annotation table. As a result, the CPU 32 acquires the number of annotations (NA1) '1'. The CPU 32 specifies the position information '(X left, X right, Y upper, Y lower)=(10, 50, 20, 60)' associated with the terminal ID 'USER B' and the material ID 'DOC2' from the annotation table. The CPU 32 compares the position information '(X left, X right, Y upper, Y lower)=(0, 320, 20, 240)' with '(X left, X right, Y upper, Y lower)=(10, 50, 20, 60)'. In this case, the CPU 32 judges that the respective position information overlaps. As a result, the CPU 32 acquires the number of pointers (NA2) '1'. The numbers of annotations (NA1, NA2) acquired in S149 is all stored in the RAM 36.

After executing S149, the CPU 32 judges whether the acquired number of annotations (NA1) is '0' (S151). When the number of annotations (NA1) is '0' (S151: Yes), the CPU 32 sets '1' as a presenter annotation priority (S153). When the number of annotations (NA1) is not '0' (S151: No), the CPU 32 sets a value calculated by an equation '1−(number of annotations (NA2)/number of annotations (NA1))', as the presenter annotation priority (S155). The presenter annotation priority set in S153 or S155 is stored in the RAM 36.

After executing S153 or S155, the CPU 32 acquires the presenter priority (PP) (S157). In S157, the CPU 32 calculates '(presenter pointer priority+presenter annotation priority)/2' and acquires the calculated value, as the presenter priority (PP). That is, the CPU 32 acquires an average value of the presenter pointer priority stored in the RAM 36 in S145 or S147 and the presenter annotation priority stored in the RAM 36 in S153 or S155, as the presenter priority (PP). The presenter priority (PP) is within a range of '0≤presenter priority (PP)≤1'. The presenter priority (PP) is stored in the RAM 36. After executing S157, the CPU 32 ends the presenter processing and returns to S107 of FIG. 15. Upon the ending, the CPU 32 deletes the terminal ID of which authentication information is 'presenter' and the number of pointers (NP1, NP2) stored in the RAM 36 in S141, the presenter pointer priority stored in the RAM 36 in S145 or S147, the numbers of annotations (NA1, NA2) stored in the RAM 36 in S149 and the presenter annotation priority stored in the RAM 36 in S153 or S155.

<Participant Processing>

Figure 18:
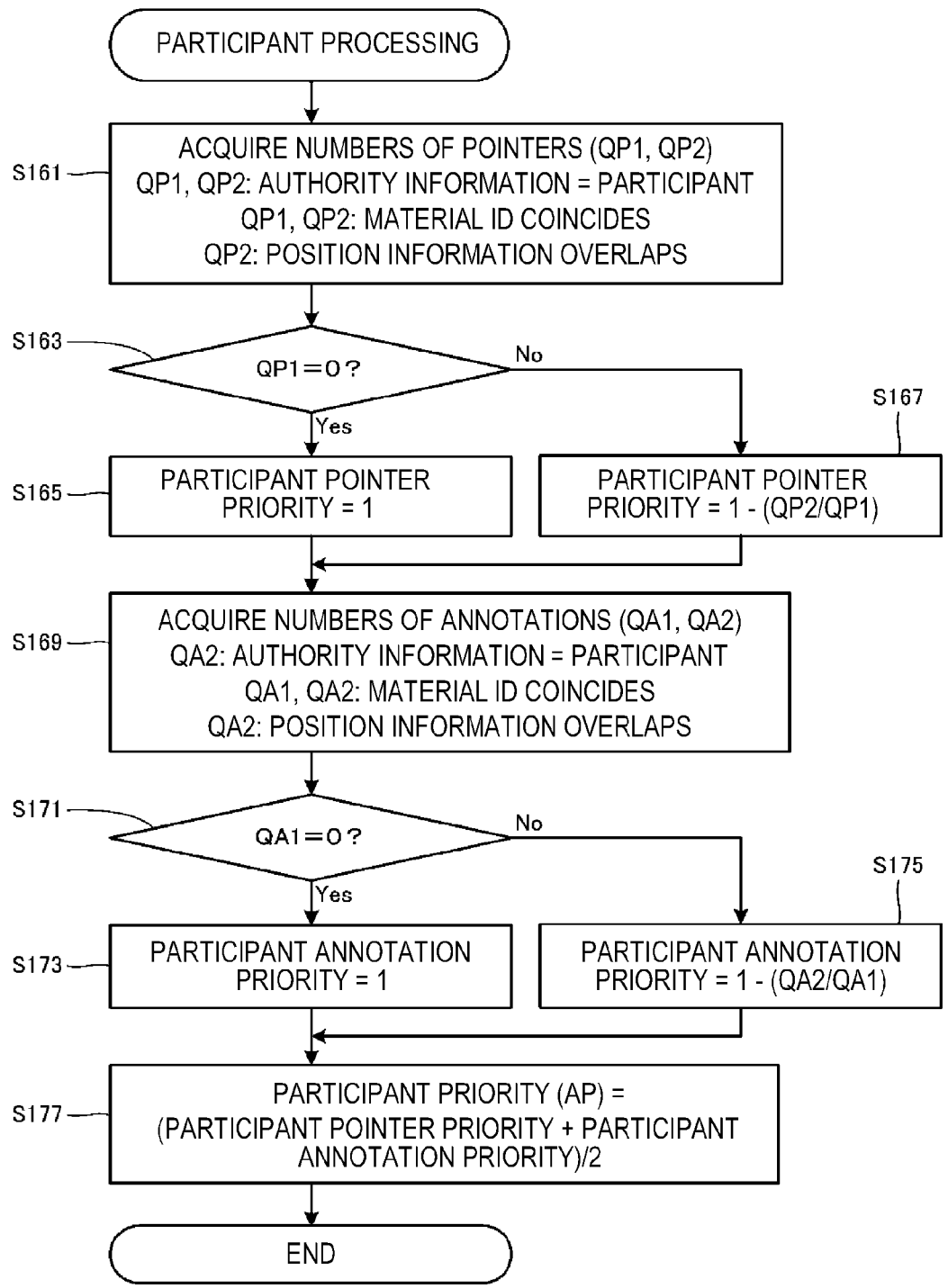
FIG. 18 is a flowchart of participant processing.

The participant processing that is executed in S107 of the priority calculation processing shown in FIG. 15 is described with reference to FIG. 18. The participant processing is executed for the candidate area selected as the processing target in S101 of FIG. 15. The CPU 32 having started the participant processing accesses the user table and the pointer table to acquire the numbers of pointers (QP1, QP2) (S161). The number of pointers (QP1) indicates a number of pointer IDs of all the pointer IDs registered in the pointer table, for which the material ID coincides with the material ID corresponding to the sharing material 61 being displayed. The number of pointers (QP2) indicates a number of pointer IDs of all the pointer IDs registered in the pointer table, for which the material ID coincides with the material ID corresponding to the sharing material 61 being displayed and the position information overlaps with the position information of the candidate area of the processing target with respect to the terminal ID of which authentication information is 'participant'. When specifying the terminal ID of which authentication information is 'participant', the CPU 32 accesses the user table. The terminal ID of which authentication information is 'participant' is stored in the RAM 36.

For example, it is assumed that the candidate area of the processing target is the candidate area 651 and the sharing material 61 being displayed is a material corresponding to the material ID 'DOC2'. Also, it is assumed that the registration state of the user table is as shown in FIG. 4, the registration state of the pointer table is as shown in FIG. 10 and the registration state of the movement candidate table is as shown in FIG. 20. At this time, the priority is not registered yet in the movement candidate table, at this timing.

The CPU 32 specifies the pointer IDs '2' and '3' associated with the material ID 'DOC2' from the pointer table. As a result, the CPU 32 acquires the number of pointers (QP1) '2'. The CPU 32 specifies the terminal IDs 'USER C' and 'USER D' of which authority information is 'participant' from the user table. The specified terminal IDs 'USER C' and 'USER D' are stored in the RAM 36. The CPU 32 specifies the position information '(X, Y)=(1180, 940)' associated with the terminal ID 'USER C' and the material ID 'DOC2' from the pointer table. In the pointer table shown in FIG. 10, the pointer ID associated with the terminal ID 'USER D is not registered yet. Therefore, the position information associated with the terminal ID 'USER D' and the material ID 'DOC2' is not specified. The CPU 32 compares the position information '(X left, X right, Y upper, Y lower)=(0, 320, 20, 240)' with '(X, Y)=(1180, 940)'. In this case, the CPU 32 judges that the respective position information does not overlap. As a result, the CPU 32 acquires the number of pointers (QP2) '0'. The position information '(X left, X right, Y upper, Y lower)=(0, 320, 20, 240)' of the candidate area 651 is stored in the RAM 36 in S121 of FIG. 16.

In contrast to FIG. 10, it is assumed in the registration state of the pointer table that the pointer ID is '3' and the position information associated with the terminal ID 'USER C' and the material ID 'DOC2' is '(X, Y)=(80, 70)'. The CPU 32 specifies the pointer IDs '2' and '3' associated with the material ID 'DOC2' from the pointer table. As a result, the CPU 32 acquires the number of pointers (QP1) '2'. The CPU 32 specifies the terminal IDs 'USER C' and 'USER D' of which authority information is 'participant' from the user table. The specified terminal IDs 'USER C' and 'USER D' are stored in the RAM 36. The CPU 32 specifies the position information '(X, Y)=(80, 70)' associated with the terminal ID 'USER C' and the material ID 'DOC2' from the pointer table. In the pointer table shown in FIG. 10, the pointer ID associated with the terminal ID 'USER D' is not registered yet. Therefore, the position information associated with the terminal ID 'USER D' and the material ID 'DOC2' is not specified. The CPU 32 compares the position information '(X left, X right, Y upper, Y lower)=(0, 320, 20, 240)' with '(X, Y)=(80, 70)'. In this case, the CPU 32 judges that the respective position information overlaps. As a result, the CPU 32 acquires the number of pointers (QP2) '1'. The numbers of pointers (QP1, QP2) acquired in S161 are all stored in the RAM 36.

After executing S161, the CPU 32 judges whether the acquired number of pointers (QP1) is '0' (S163). When the number of pointers (QP1) is '0' (S163: Yes), the CPU 32 sets '1' as a participant pointer priority (S165). When the number of pointers (QP1) is not '0' (S163: No), the CPU 32 sets a value calculated by an equation '1−(number of pointers (QP2)/number of pointers (QP1))', as the participant pointer priority (S167). The participant pointer priority set in S165 or S167 is stored in the RAM 36.

After executing S165 or S167, the CPU 32 accesses the annotation table to acquire numbers of annotations (QA1, QA2) (S169). The number of annotations (QA1) indicates a number of annotation IDs of all the annotation IDs registered in the annotation table, for which the material ID coincides with the material ID corresponding to the sharing material 61 being displayed. The number of annotations (QA2) indicates a number of annotation IDs of all the annotation IDs registered in the annotation table, for which the material ID coincides with the material ID corresponding to the sharing material 61 being displayed and the position information overlaps with the position information of the candidate area of the processing target with respect to the terminal ID of which authentication information is 'participant'.

For example, it is assumed that the candidate area of the processing target is the candidate area 651 and the sharing material 61 being displayed is a material corresponding to the material ID 'DOC2'. Also, it is assumed that the registration state of the user table is as shown in FIG. 4, the registration state of the annotation table is as shown in FIG. 11 and the registration state of the movement candidate table is as shown in FIG. 20. At this time, the priority is not registered yet in the movement candidate table, at this timing.

The CPU 32 specifies the annotation IDs '2' and '3' associated with the material ID 'DOC2' from the annotation table. As a result, the CPU 32 acquires the number of annotations (QA1) '2'. The CPU 32 specifies, from the annotation table, the position information '(X left, X right, Y upper, Y lower)= 200, 300, 300, 450)' and '(X left, X right, Y upper, Y lower)= (1100, 1200, 900, 930)' associated with the terminal ID 'USER C' or 'USER D' of which authority information is 'participant' stored in the RAM 36 in S161. The CPU 32 compares the position information '(X left, X right, Y upper, Y lower)=(0, 320, 0, 240)' with '(X left, X right, Y upper, Y lower)=(200, 300, 300, 450)'. In this case, the CPU 32 judges that the respective position information does not overlap. The CPU 32 compares the position information '(X left, X right, Y upper, Y lower)=(0, 320, 0, 240)' with '(X left, X right, Y upper, Y lower)=(1100, 1200, 900, 930)'. In this case, the CPU 32 judges that the respective position information does not overlap. As a result, the CPU 32 acquires the number of annotations (QA2) '0'. The position information '(X left, X right, Y upper, Y lower)=(0, 320, 0, 240)' of the candidate area 651 is stored in the RAM 36 in S121 of FIG. 16.

In contrast to FIG. 11, it is assumed in the registration state of the annotation table that the annotation ID is '3' and the position information associated with the terminal ID 'USER D' and the material ID 'DOC2' is '(X left, X right, Y upper, Y lower)=(10, 50, 20, 60)'. The CPU 32 specifies the annotation IDs '2' and '3' associated with the material ID 'DOC2' from the annotation table. As a result, the CPU 32 acquires the number of annotations (QA1) '2'. The CPU 32 specifies, from the annotation table, the position information '(X left, X right, Y upper, Y lower)=(200, 300, 300, 450)' and '(X left, X right, Y upper, Y lower)=(10, 50, 20, 60)' associated with the terminal ID 'USER C' or 'USER D' and the material ID 'DOC2'. The CPU 32 compares the position information '(X left, X right, Y upper, Y lower)=(0, 320, 0, 240)' with '(X left, X right, Y upper, Y lower)=(200, 300, 300, 450)'. In this case, the CPU 32 judges that the respective position information does not overlap. The CPU 32 compares the position information '(X left, X right, Y upper, Y lower)=(0, 320, 0, 240)' with '(X left, X right, Y upper, Y lower)=(10, 50, 20, 60)'. In this case, the CPU 32 judges that the respective position information overlaps. As a result, the CPU 32 acquires the number of annotations (QA2) '1'. The numbers of annotations (QA1, QA2) acquired in S169 is all stored in the RAM 36.

After executing S169, the CPU 32 judges whether the acquired number of annotations (QA1) is '0' (S171). When the number of annotations (QA1) is '0' (S171: Yes), the CPU 32 sets '1' as a participant annotation priority (S173). When the number of annotations (QA1) is not '0' (S171: No), the CPU 32 sets a value calculated by an equation '1−(number of annotations (QA2)/number of annotations (QA1))', as the participant annotation priority (S175). The participant annotation priority set in S173 or S175 is stored in the RAM 36.

After executing S173 or S175, the CPU 32 acquires the participant priority (AP) (S177). In S177, the CPU 32 calculates '(participant pointer priority+participant annotation priority)/2' and acquires the calculated value, as the participant priority (AP). That is, the CPU 32 acquires an average value of the participant pointer priority stored in the RAM 36 in S165 or S167 and the participant annotation priority stored in the RAM 36 in S173 or S175, as the participant priority (AP). The participant priority (AP) is within a range of '0≤participant priority (AP)≤1'. The participant priority (AP) is stored in the RAM 36. After executing S177, the CPU 32 ends the participant processing and returns to S109 of FIG. 15. Upon the ending, the CPU 32 deletes the terminal ID of which authentication information is 'participant' and the number of pointers (QP1, QP2) stored in the RAM 36 in S161, the participant pointer priority stored in the RAM 36 in S165 or S167, the numbers of annotations (QA1, QA2) stored in the RAM 36 in S169 and the participant annotation priority stored in the RAM 36 in S173 or S175. Also, the CPU 32 deletes the position information stored in the RAM 36 in S121 of FIG. 16.

<Movement Candidate Calculation Processing>

The movement candidate calculation processing of a second embodiment is described with reference to FIG. 19. The CPU 32 having started the movement candidate calculation processing associates the respective position information of the candidate areas 651, 652, 653, 654 with the candidate area IDs and registers the same in the movement candidate table (refer to S181 and FIG. 20). The correspondence of the respective candidate area IDs and the candidate areas 651, 652, 653, 654 in FIG. 20 is the same as the above. The respective position information of the candidate areas 651, 652, 653, 654 is registered in the program of the movement candidate calculation processing of the second embodiment, for example. The movement candidate table is stored and managed in the RAM 36. The CPU 32 selects, as a processing target, one of the candidate areas 651, 652, 653, 654 registered in the movement candidate table (S183). A candidate area to be selected is a candidate area, which has not been as the processing target in S183, of the candidate areas 651, 652, 653, 654. The CPU 32 stores the candidate area ID of the selected candidate area in the RAM 36 whenever executing S183. In S183, the CPU 32 specifies the candidate area ID not stored in the RAM 36, as a candidate area ID not selected as the processing target.

Subsequently, the CPU 32 accesses the movement candidate table to acquire a priority associated with the candidate area ID of the candidate area of the processing target (S185). For example, it is assumed that the registration state of the movement candidate table is as shown in FIG. 20. When the candidate area of the processing target is the candidate area 651, the CPU 32 acquires the priority '0'. The priority is registered in the movement candidate table in S109 of FIG. 15. When the candidate area of the processing target is the candidate area 652 or the candidate area 653, the CPU 32 acquires the priority '1'. When the candidate area of the processing target is the candidate area 654, the CPU 32 acquires the priority '0.5'. The acquired priority is stored in the RAM 36.

Subsequently, the CPU 32 judges whether the acquired priority is a second value. In the illustrative embodiment, the second value is '0', as described above. When the acquired priority is a second value (S187: Yes, priority=0), the CPU 32 sets a guide image corresponding to the candidate area of the processing target to a non-display (S189) and proceeds to S197. For example, it is assumed that the candidate area of the processing target is the candidate area 651. In this case, the guide image 641 corresponding to the candidate area 651 is not displayed. S189 corresponds to S85 of the movement candidate calculation processing (FIG. 12) of the first embodiment. The CPU 32 executes S189, as described above with respect to S85. In the meantime, when the decoding of the image data corresponding to the guide image and the output of the display instruction to the display unit 38 are not executed, the CPU 32 proceeds to S197 after a result of the judgment in S187 is positive (S187: Yes).

When the priority is not the second value (S187: No, priority >0), the CPU 32 judges whether the priority is a first value (S191). In the illustrative embodiment, the first value is '1', as described above. When the priority is the first value (S191: Yes, priority=1), the CPU 32 controls the display of the guide image corresponding to the candidate area of the processing target (S193). For example, it is assumed that the candidate area of the processing target is the candidate area 652. The CPU 32 decodes the image data corresponding to the guide image 642. The respective image data corresponding to the respective guide images 641, 642, 643, 643 is stored with being associated with the program of the movement candidate calculation processing of the second embodiment in the storage device 34, for example. The CPU 32 outputs a display instruction to display the generated guide image 642 at a position indicated by the position information associated with the candidate area ID '652' in the movement candidate table, to the display unit 38. In response to this, the guide image 642 is displayed at the position indicated by the position information (refer to FIG. 2). The guide image displayed in S193 has transmittance of 0%. After executing S193, the CPU 32 proceeds to S197.

When the priority is not the first value (S191: No, 0<priority<1), the CPU 32 controls the display of the guide image corresponding to the candidate area of the processing target (S195). When a result of the judgment in S191 is negative (S191: No), the priority is a third value (0<third value<1) between the first value '1' and the second value '0'. In S195, the CPU 32 increases the transmittance of the guide image above the transmittance in S193. For example, it is assumed that the candidate area of the processing target is the candidate area 654. The CPU 32 decodes the image data corresponding to the guide image 644 with a setting in which the transmittance is increased above the transmittance in S193. The transmittance is set with a predetermined value (for example, 40%). The transmittance is registered in the program of the movement candidate calculation processing of the second embodiment, for example. The CPU 32 outputs a display instruction to display the generated guide image 644 at a position indicated by the position information associated with the candidate area ID '654' in the movement candidate table, to the display unit 38. In response to this, the guide image 44 is displayed at the position indicated by the position information at a state where the sharing material 61 as a background, which cannot be visibly recognized in S193, is transparent (refer to FIG. 2). The transmittance of a digital image is expressed by an a value. Therefore, when an image has transmittance, the image is a set of pixels expressed by four information of RGB values and a value. In FIG. 2, the guide image 644 is not shown at the above-described state. After executing S195, the CPU 32 proceeds to S197.

In S197, the CPU 32 judges whether S183 to S195 have been executed for all the candidate areas 651, 652, 653, 654 registered in the movement candidate table. The CPU 32 executes the processing of S197 by judging whether there is a candidate area ID not stored in the RAM 36. When S183 to S195 have not been executed for all the candidate areas 651, 652, 653, 654 (S197: No), the CPU 32 returns to S183 and executes the processing after S183. When S183 to S195 have been executed for all the candidate areas 651, 652, 653, 654 (S197: Yes), the CPU 32 ends the movement candidate calculation processing of the second embodiment and returns to S53 of FIG. 8. Upon the ending, the CPU 32 deletes the candidate area ID stored in the RAM 36 in S183 and the priority stored in the RAM 36 in S185.

Effects of Illustrative Embodiment

According to the above illustrative embodiment, following effects can be accomplished.

Figure 12:
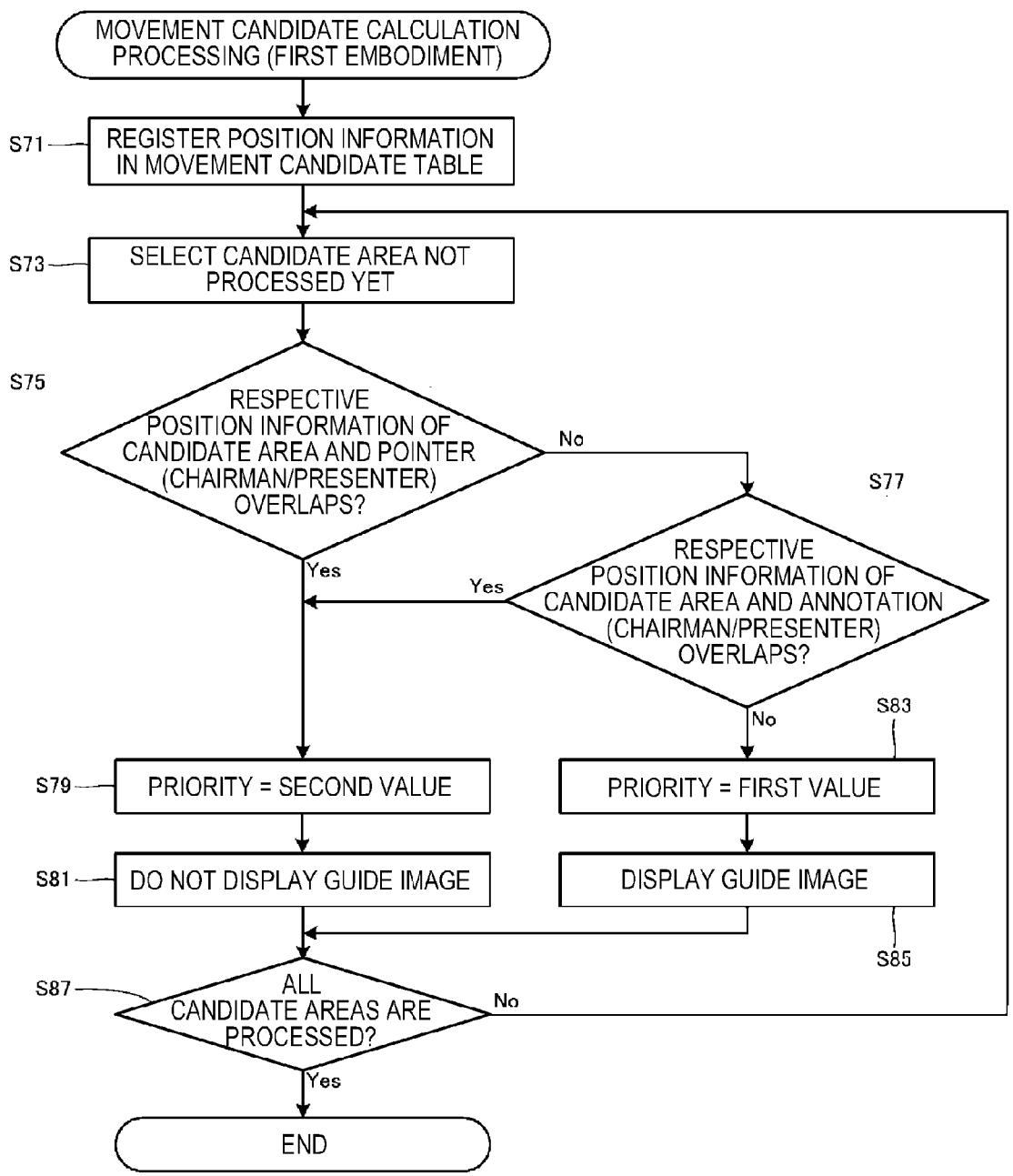
FIG. 12 is a flowchart of movement candidate calculation processing of a first embodiment.

(1) In the movement candidate calculation processing of the first embodiment shown in FIG. 12, the priority is set to the second value or first value, depending on the judgment result in S75 and S77 (refer to S79 or S83 of FIG. 12). The guide image corresponding to the candidate area of which priority is set to the second value is not displayed (refer to S81). The guide image corresponding to the candidate area of which priority is set to the first value is displayed (refer to S85). For this reason, it is possible to determine the candidate areas 651, 652, 653, 654 for displaying the guide images 641, 642, 643, 643, based on the correspondence of the position information of the pointer 65 and annotation 66 and the position information of the candidate areas 651, 652, 653, 654 at the counterpart apparatus 71 (the terminal ID: USER A, refer to FIG. 4) associated with the authority information 'chairman' or at the counterpart apparatus 72 (the terminal ID: USER B, refer to FIG. 4) associated with the authority information 'presenter'. Also, it is possible to prevent the guide images 641, 642, 643, 643 from being displayed with overlapping with the pointer 65 and annotation 66.

Figure 19:
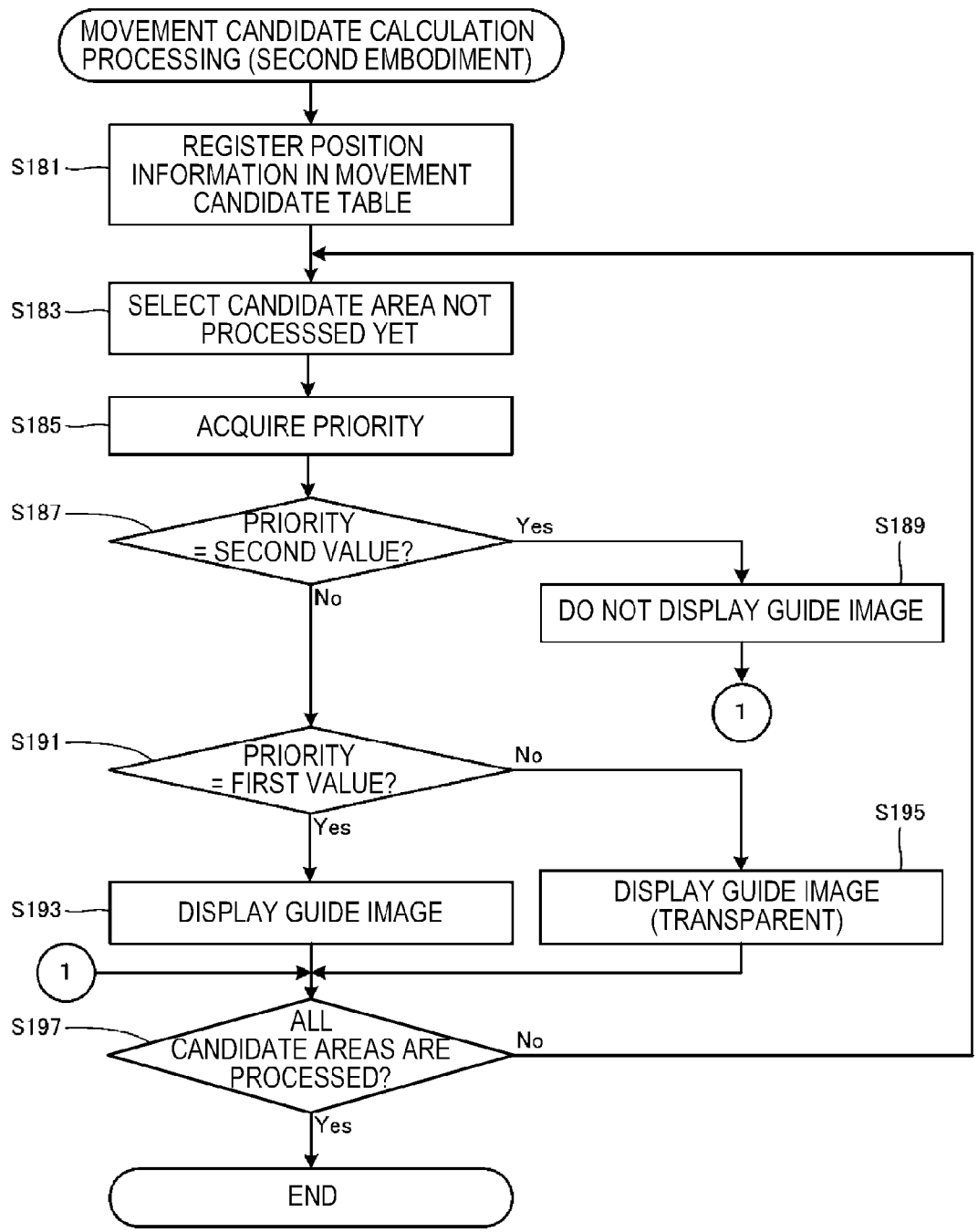
FIG. 19 is a flowchart of movement candidate calculation processing of the second embodiment.

(2) In the movement candidate calculation processing of the second embodiment shown in FIG. 19, the guide image corresponding to the candidate area of which priority is set to the second value is not displayed (refer to S187: Yes and S189). The guide image corresponding to the candidate area of which priority is set to the first value is displayed (refer to S191: Yes and S193). The guide image corresponding to the candidate area of which priority is set to the third value between the first value and the second value is displayed with being more transparent than the guide image having the priority of the first value (refer to S191: No and S195). The priority is calculated by multiplying the chairman priority (HP), the presenter priority (PP) and the participant priority (AP) each other in S109 of the priority calculation processing shown in FIG. 15. The chairman priority (HP) is set in the chairman processing (refer to FIG. 16) that is executed in S103 of FIG. 15. The presenter priority (PP) is set in the presenter processing (refer to FIG. 17) that is executed in S105 of FIG. 15. The participant priority (AP) is set in the participant processing (refer to FIG. 18) that is executed in S107 of FIG. 15. For this reason, it is possible to control the display or non-display of the guide images 641, 642, 643, 643, depending on the authorities.

Figure 8:
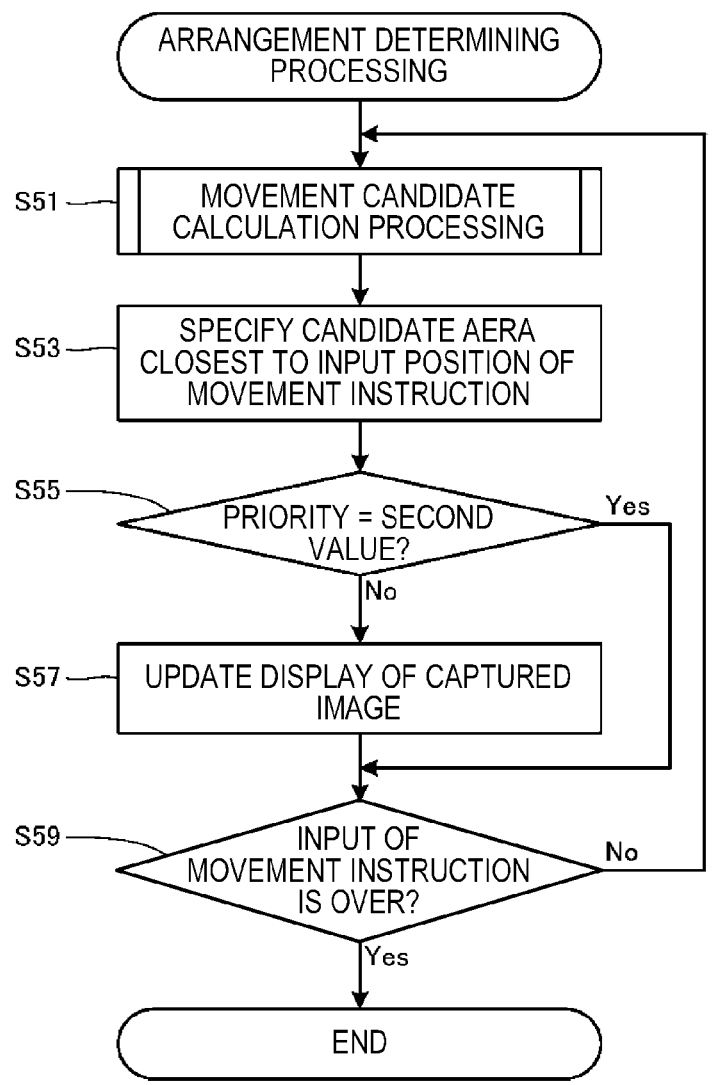
FIG. 8 is a flowchart of arrangement determining processing.

(3) In the arrangement determining processing shown in FIG. 8, when the priority set for the candidate area, which is closest to the input position of the movement instruction, of the candidate areas 651, 652, 653, 654 is not the second value (refer to S55: No in FIG. 8), the corresponding candidate area is set as the sub-display area 64. For this reason, it is possible to preferentially set the candidate area closest to the input position of the movement instruction as the sub-display area 64, and to newly display the captured image 63 in S57 when the corresponding candidate area is a moveable candidate area (refer to S55: No in FIG. 8). It is assumed that when it is not possible to move the captured image 63 (refer to S55: Yes in FIG. 8), the user of the terminal apparatus 30 changes the moving direction to another direction and continues to input the movement instruction. In this case, in the arrangement determining processing, the processing after S51 is executed, considering that the input of the movement instruction is not over (refer to S59: No in FIG. 8). The processing is iteratively executed, so that it is possible to move the captured image 63 to the position closest to the input position of the movement instruction.

Modified Embodiments

The above illustrative embodiment may be modified as follows. Some configurations of the following modified embodiments may be appropriately combined and adopted. In the below, the differences to the above illustrative embodiment are described and the same descriptions are appropriately omitted.

(1) In the above illustrative embodiment, the remote conference system 10 including the server apparatus 20 has been exemplified (refer to FIG. 1). The terminal apparatus 30 and the counterpart apparatuses 71, 72, 73 may directly perform communication through the network 90 to hold the remote conference. In the remote conference system 10 in which the remote conference of the P2P type is held, the server apparatus 20 is omitted.

Figure 17:
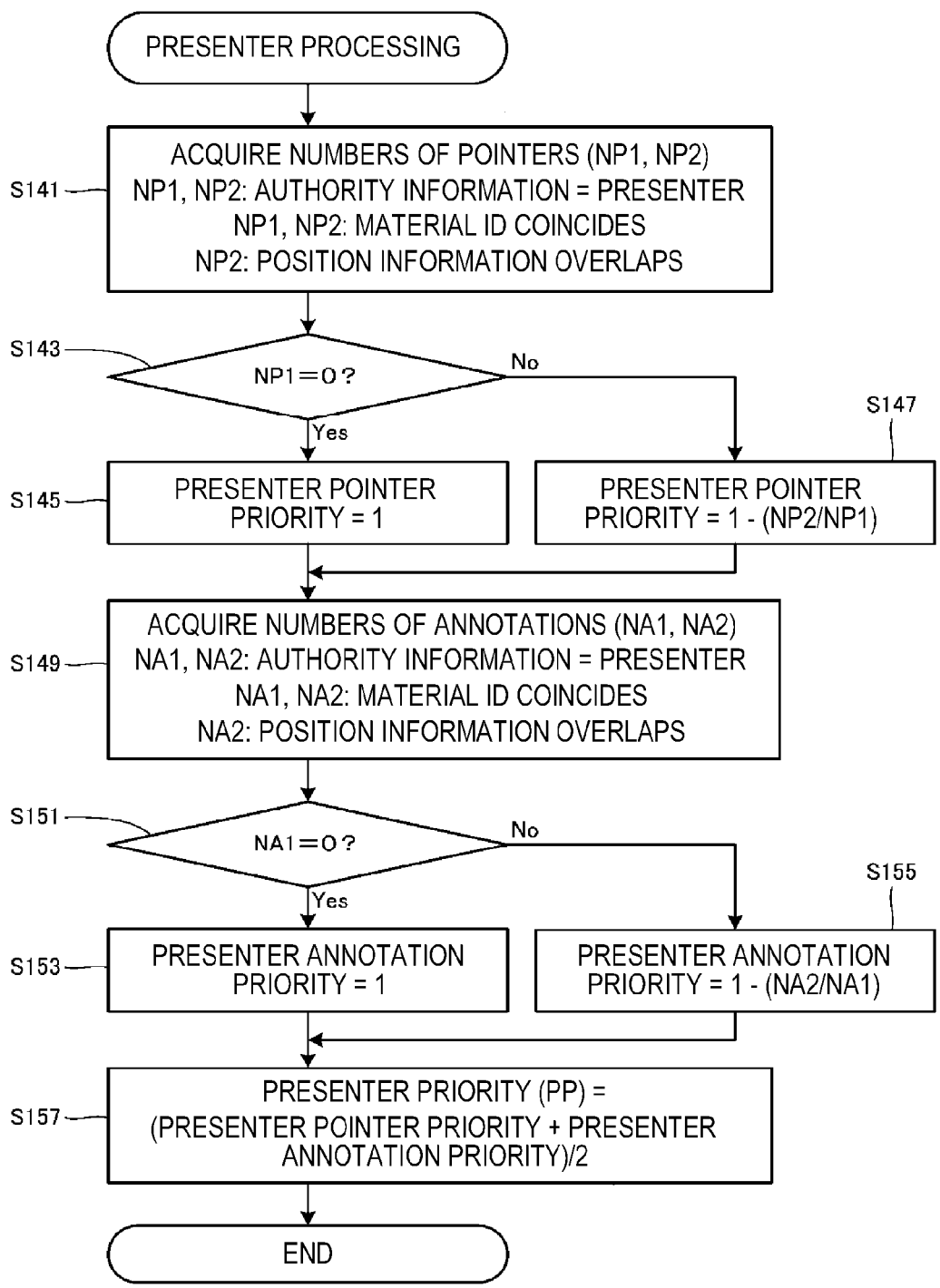
FIG. 17 is a flowchart of presenter processing.

(2) In the above illustrative embodiment, the presenter pointer priority '1' is set in S145 of the presenter processing shown in FIG. 17 and the presenter annotation priority '1' is set in S153. Also, the presenter pointer priority is set to the value calculated by '1−(number of pointers (NP2)/number of pointers (NP1))' in S147 and the presenter annotation priority is set to the value calculated by '1−(number of annotations (NA2)/number of annotations (NA1))' in S155. That is, in the presenter processing, the weights for the number of pointers and the number of annotations are set to be the same. This is also the same for the participant processing shown in FIG. 18 (refer to S165, S173, S167 and S175 in FIG. 18). The presenter priority (PP) and/or the participant priority (AP) may be set with a weight on any one of the number of pointers and the number of annotations. It is possible to appropriately determine whether to weight any one of the number of pointers and the number of annotations, considering all conditions.

(3) In the above illustrative embodiment, the respective position information of the candidate areas 651, 652, 653, 654 is registered in the program of the movement candidate calculation processing of the second embodiment shown in FIG. 19, for example. The CPU 32 associates the respective position information of the candidate areas 651, 652, 653, 654 with the candidate area IDs and registers the same in the movement candidate table, in S181 of FIG. 19. The respective position information of the candidate areas 651, 652, 653, 654 may be registered in the program of the priority calculation processing shown in FIG. 15. In this case, the CPU 32 reads out the respective position information of the candidate areas 651, 652, 653, 654 from the program of the priority calculation processing, before S101 of FIG. 15. The CPU 32 associates the read position information with the candidate area IDs and registers the same in the movement candidate table. The movement candidate table is stored and managed in the RAM 36. In this case, in the movement candidate calculation processing of the second embodiment, S181 is omitted. In S183, the CPU 32 selects one candidate area, which has not been selected as the processing target in S183, from the candidate areas 651, 652, 653, 654 registered in the movement candidate table stored in the RAM 36.

(4) In the above illustrative embodiment, in S195 of the movement candidate calculation processing of the second embodiment shown in FIG. 19, the guide image having predetermined transmittance is displayed. The transmittance of the guide image displayed in S195 may be set as follows. That is, the display aspect may be changed depending on the value of the priority (0<priority<1) associated with the candidate area ID of the candidate area of the processing target selected in S183 in the movement candidate table (refer to FIG. 20). For example, when the value of the priority decreases, the transmittance of the guide image may be increased. The CPU 32 controls the display of the guide image, depending on the value of the priority. The transmittance of the digital image is expressed by the a value, as described above.

For example, the transmittance is set as a value expressed by a percentage of a value obtained by subtracting the value of priority from '1', which is a reference value. When the priority is the third value '0.5' (refer to the candidate area ID '654' in FIG. 20), the transmittance is set to '50%=(1−0.5)×100'. According to this equation, when the priority is the second value '0' (refer to the candidate area ID '651' in FIG. 20), the transmittance is '100%=(1−0)×100'. This conforms to the non-display of the guide image in S189 of FIG. 19. Also, when the priority is the first value '1' (refer to the candidate area IDs '652' and '653' in FIG. 20), the transmittance is '0%=(1−1)×100'. This conforms to the display of the guide image in S193 of FIG. 19. S189 and S193 may be executed depending on the transmittance obtained by the equation.

In the meantime, the non-display of the guide image in S81 of the movement candidate calculation processing of the first embodiment shown in FIG. 12 may be performed by determining the transmittance '100%' on the basis of the second value '0' set in S79 and the equation '(1−0)×100'. Likewise, the display of the guide image in S85 may be performed by determining the transmittance '0%' on the basis of the first value '1' set in S83 and the equation '(1−1)×100'.

(5) In the arrangement determining processing shown in FIG. 8, it is also assumed that the guide image is not displayed for all the candidate areas 651, 652, 653, 654 in the movement candidate calculation processing (refer to FIG. 12 or 19) to be executed in plural times (refer to S81 of FIG. 12 or S189 of FIG. 19). In this case, the user of the terminal apparatus 30 may assume that all the candidate areas 651, 652, 653, 654 are important. On one hand, when an input of the movement instruction is received (refer to S31: Yes in FIG. 5), it means that the user intends the movement. For this reason, when the input of the movement instruction is received and the guide images 641, 642, 643, 643 are set not to be displayed for all the candidate areas 651, 652, 653, 654, all the candidate areas 651, 652, 653, 654 may be set to be moveable and the guide images 641, 642, 643, 643 may be displayed therein. In this case, like S195 of FIG. 19, the guide images 641, 642, 643, 643 may be set to have predetermined transmittance.

What is claimed is:

1. A non-transitory computer readable recording medium storing a program which is executable by a computer configured to control a terminal apparatus used for a remote conference with a counterpart apparatus through a network, the program causing the computer to execute:

a detection instruction of detecting an input of a movement instruction through an operation unit of the terminal apparatus, the movement instruction being to move a position of a sub-display area in which a sub-display image is to be displayed on a main display image in a remote conference screen, wherein the sub-display image overlaps with a part of the main display image in the remote conference screen;

a registration instruction of registering position information in a storage unit, the position information being acquired through a communication unit connected to the network, the position information indicating an input position of input information with respect to a predetermined position of a counterpart main display image on a counterpart remote conference screen which is displayed on the counterpart apparatus;

a first judgment instruction of judging whether the position information registered in the storage unit corresponds to position information of each of a plurality of candidate areas, the plurality of candidate areas being movement destination candidates of the sub-display area;

a determination instruction of determining a priority of the candidate area of the position information not corresponding to the position information registered in the storage unit to be a first value, and determining a priority of the candidate area of the position information corresponding to the position information registered in the storage unit to be a second value, the second value being different from the first value; and a first display control instruction of displaying a guide image corresponding to the candidate area with a priority of the first value, in correspondence to the detected input of the movement instruction, without displaying a guide image corresponding to the candidate area with a priority of the second value.

2. The non-transitory computer readable recording medium according to claim 1, wherein the program causes the computer to execute:

a specifying instruction of specifying the candidate area closest to an input position of the movement instruction based on position information indicating the input position of the movement instruction and the respective position information of the plurality of candidate areas;

a second judgment instruction of judging whether the specified candidate area is the candidate area with a priority of the first value or the candidate area with a priority of the second value;

a setting instruction of, when the specified candidate area is the candidate area with a priority of the first value, setting the specified candidate area as a new sub-display area, and when the specified candidate area is the candidate area with a priority of the second value, not setting the specified candidate area as the new sub-display area; and a second display control instruction of displaying the sub-display image in a state where the sub-display image on the main display image is arranged in the new sub-display area.

3. The non-transitory computer readable recording medium according to claim 1, wherein the registration instruction includes an instruction of associating an authority, which is preset to the counterpart apparatus which provides the input information, with the position information indicating the input position of the input information, the authority being selected from a first type authority and a second type authority having a rank higher than a rank of the first type authority, and when the position information registered in the storage unit corresponds to the position information of the candidate area and the authority associated with the position information registered in the storage unit is the second type authority, the determination instruction causes the computer to determine the priority of the candidate area with the position information corresponding to the position information registered in the storage unit to be the second value.

4. The non-transitory computer readable recording medium according to claim 1, wherein the registration instruction includes an instruction of associating an authority, which is preset for the counterpart apparatus which provides the input information, with the position information indicating the input position of the input information, the authority being selected from a first type authority and a second type authority having a rank lower than a rank of the first type authority, when the position information registered in the storage unit corresponds to the position information of the candidate area and the authority associated with the position information registered in the storage unit is the first type authority, the determination instruction causes the computer to determine the priority of the candidate area with the position information corresponding to the position information registered in the storage unit to be the second value, and when the position information registered in the storage unit corresponds to the position information of the candidate area and the authority associated with the position information registered in the storage unit is the second type authority, the determination instruction causes the computer to determine the priority with the candidate area of the position information corresponding to the position information registered in the storage unit to be the first value or a third value between the first value and the second value.

5. The non-transitory computer readable recording medium according to claim 4, wherein the first display control instruction includes an instruction of displaying a first guide image, as the guide image corresponding to the candidate area with a priority of the first value, in correspondence to the detected input of the movement instruction, and displaying a second guide image having a display aspect different from that of the first guide image, as the guide image corresponding to the candidate area of which priority is determined as the third value, in correspondence to the detected input of the movement instruction.

6. The non-transitory computer readable recording medium according to claim 5, wherein the determination instruction includes an instruction of determining the third value in response to a number of pieces of the position information which is registered and associated with the second type authority in the storage unit and corresponds to the position information of the candidate area.

7. The non-transitory computer readable recording medium according to claim 6, wherein the first display control instruction includes an instruction of changing the display aspect of the second guide image in accordance with the third value.

8. The non-transitory computer readable recording medium according to claim 5, wherein the program causes the computer to execute:

a specifying instruction of specifying the candidate area closest to the input position of the movement instruction, in accordance with position information indicating the input position of the movement instruction detected by the detection instruction and the respective position information of the plurality of candidate areas;

a second judgment instruction of judging whether the specified candidate area is the candidate area of which priority is one of the first value and third value or the candidate area of which priority is the second value;

a setting instruction of, when the specified candidate area is the candidate area with a priority of one of the first value and third value, setting the specified candidate area as a new sub-display area, and when the specified candidate area is the candidate area with a priority of the second value, not setting the specified candidate area as the new sub-display area; and a second display control instruction of displaying the sub-display image in a state where the sub-display image on the main display image is arranged in the new sub-display area.

9. The non-transitory computer readable recording medium according to claim 1, wherein the first display control instruction includes an instruction of stop displaying the guide image, which is displayed in correspondence to the detected input of the movement instruction, at timing at which the input of the movement instruction is not detected by the detection instruction.

10. A non-transitory computer readable recording medium storing a program which is executable by a computer configured to control a terminal apparatus used for a remote conference with a counterpart apparatus through a network, the program causing the computer to execute:

a detection instruction of detecting an input of a movement instruction through an operation unit of the terminal apparatus, the movement instruction being to move a position of a sub-display area in which a sub-display image is to be displayed on a main display image in a remote conference screen, wherein the sub-display image overlaps with a part of the main display image in the remote conference screen;

a registration instruction of registering position information in a storage unit, the position information being acquired through a communication unit connected to the network, the position information indicating an input position of input information with respect to a predetermined position of a counterpart main display image on a counterpart remote conference screen which is displayed on the counterpart apparatus;

a judgment instruction of making a judgment whether the position information registered in the storage unit corresponds to position information of each of a plurality of candidate areas, the plurality of candidate areas being movement destination candidates of the sub-display area; and a display control instruction of displaying a guide image corresponding to the candidate area, which does not correspond to the position information registered in the storage unit, in correspondence to the detected input of the movement instruction, without displaying the guide image corresponding to the candidate area, which corresponds to the position information registered in the storage unit, in correspondence to the detected input of the movement instruction.

11. A terminal apparatus used for a remote conference with a counterpart apparatus through a network, the terminal apparatus comprising:

a processor; and memory storing computer executable instructions, when executed by the processor, causing the terminal apparatus to execute:

a detection instruction of detecting an input of a movement instruction through an operation unit of the terminal apparatus, the movement instruction being to move a position of a sub-display area in which a sub-display image is to be displayed on a main display image in a remote conference screen, wherein the sub-display image overlaps with a part of the main display image in the remote conference screen;

a registration instruction of registering position information in a storage unit, the position information being acquired through a communication unit connected to the network, the position information indicating an input position of input information with respect to a predetermined position of a counterpart main display image on a counterpart remote conference screen which is displayed on the counterpart apparatus;

a judgment instruction of making a judgment whether the position information registered in the storage unit corresponds to position information of each of a plurality of candidate areas, the plurality of candidate areas being movement destination candidates of the sub-display area;

a determination instruction of determining a priority of the candidate area of the position information not corresponding to the position information registered in the storage unit to be a first value, and determining a priority of the candidate area of the position information corresponding to the position information registered in the storage unit to be a second value, the second value being different from the first value; and a display control instruction of displaying a guide image corresponding to the candidate area with a priority of the first value, in correspondence to the detected input of the movement instruction, without displaying a guide image corresponding to the candidate area with a priority of the second value.

* * * * *